(12) United States Patent
Monobe et al.

(10) Patent No.: US 8,606,008 B2
(45) Date of Patent: *Dec. 10, 2013

(54) IMAGE PROCESSING DEVICE, IMAGE PROCESSING METHOD, IMAGE PROCESSING PROGRAM, AND INTEGRATED CIRCUIT

(71) Applicant: Panasonic Corporation, Osaka (JP)

(72) Inventors: Yusuke Monobe, Kyoto (JP); Haruo Yamashita, Osaka (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,824

(22) Filed: Nov. 27, 2012

(65) Prior Publication Data
US 2013/0084021 A1    Apr. 4, 2013

Related U.S. Application Data

(63) Continuation of application No. 13/210,580, filed on Aug. 16, 2011, now Pat. No. 8,340,419, and a continuation of application No. 11/806,811, filed on Jun. 4, 2007, now Pat. No. 8,023,733.

(30) Foreign Application Priority Data

Jun. 8, 2006    (JP) .................................. 2006-159432

(51) Int. Cl.
*G06K 9/00*    (2006.01)
(52) U.S. Cl.
USPC ........... 382/168; 382/167; 382/162; 382/165; 382/164; 358/158; 358/520; 358/521; 358/485; 358/463

(58) Field of Classification Search
USPC ........... 382/68, 169, 167, 275, 165, 166, 173, 382/180, 190, 191, 192, 199, 204, 205, 206, 382/232, 168; 358/1.9, 518, 522
See application file for complete search history.

(56) References Cited

U.S. PATENT DOCUMENTS

| | | | |
|---|---|---|---|
| 4,367,490 A | 1/1983 | Riederer | |
| 4,984,071 A | 1/1991 | Yonezawa | |
| 5,517,333 A | 5/1996 | Tamura et al. | |
| 6,058,248 A | 5/2000 | Atkins et al. | |
| 6,101,271 A | 8/2000 | Yamashita et al. | |

(Continued)

FOREIGN PATENT DOCUMENTS

| | | |
|---|---|---|
| JP | 04-282689 | 10/1992 |
| JP | 2001-186378 | 7/2001 |

(Continued)

*Primary Examiner* — Mekonen Bekele
(74) *Attorney, Agent, or Firm* — Wenderoth, Lind & Ponack, L.L.P.

(57) ABSTRACT

The grayscale of an input signal is converted without amplifying noise components thereof. A grayscale conversion portion performs grayscale conversion on an input signal IS to create a converted signal TS, a noise reduction degree determining portion determines a noise reduction degree NR that expresses a strength of noise reduction processing to be applied to the converted signal based on the input signal IS and the converted signal TS, and a noise reducing portion executes noise reduction processing on the converted signal TS based on the noise reduction degree NR. By doing this, it is possible to convert the grayscale of the input signal without enhancing the noise.

3 Claims, 14 Drawing Sheets

(56) References Cited

U.S. PATENT DOCUMENTS

| | | |
|---|---|---|
| 7,453,523 B2 | 11/2008 | Yamauchi |
| 7,570,390 B2 | 8/2009 | Mitsunaga |
| 7,719,551 B2 | 5/2010 | Aoki et al. |
| 7,778,478 B2 | 8/2010 | Kuniba |
| 7,973,860 B2 | 7/2011 | Hsieh et al. |
| 8,023,733 B2 * | 9/2011 | Monobe et al. ............... 382/168 |
| 8,035,853 B2 | 10/2011 | Sambongi et al. |
| 8,059,904 B2 | 11/2011 | Hoshuyama |
| 8,326,072 B2 * | 12/2012 | Someya et al. ............... 382/260 |
| 8,340,419 B2 * | 12/2012 | Monobe et al. ............... 382/168 |
| 2004/0036703 A1 | 2/2004 | Aoki et al. |
| 2004/0234155 A1 | 11/2004 | Hoshuyama |
| 2005/0127846 A1 | 6/2005 | Kim |
| 2005/0226526 A1 | 10/2005 | Mitsunaga |
| 2005/0265627 A1 | 12/2005 | Yamauchi |
| 2006/0215925 A1 | 9/2006 | Kuniba |
| 2007/0165282 A1 | 7/2007 | Sambongi et al. |
| 2007/0286481 A1 * | 12/2007 | Monobe et al. ............... 382/169 |
| 2009/0041348 A1 * | 2/2009 | Someya et al. ............... 382/167 |
| 2011/0299773 A1 * | 12/2011 | Monobe et al. ............... 382/167 |
| 2013/0018265 A1 * | 1/2013 | Kim et al. .................... 600/443 |

FOREIGN PATENT DOCUMENTS

| | | |
|---|---|---|
| JP | 2001-309177 | 11/2001 |
| JP | 2004-007202 | 1/2004 |
| JP | 2004-080299 | 3/2004 |
| JP | 2004-200971 | 7/2004 |
| JP | 2005-275581 | 10/2005 |
| JP | 2005-318063 | 11/2005 |
| JP | 3723043 | 12/2005 |
| WO | 2005/055588 | 6/2005 |

* cited by examiner

IMAGE PROCESSING DEVICE, IMAGE PROCESSING METHOD, IMAGE PROCESSING PROGRAM, AND INTEGRATED CIRCUIT

BACKGROUND OF THE INVENTION

1. Field of the Invention

The present invention relates to image processing devices, image processing methods, image processing programs, and integrated circuits, and in particular relates to image processing devices, image processing methods, image processing programs, and integrated circuits that perform grayscale conversion without enhancing noise in the input signal.

2. Description of the Related Art

In general, image-capturing devices and display devices perform grayscale conversion for the purpose of correcting the brightness or the contrast of an input signal. Pixel unit processing and processing in which the surrounding region is referenced are known as examples of grayscale conversion.

Pixel unit processing is conversion processing that is performed based on only the pixel value of a target pixel, without referencing pixels other than the target pixel. A specific example is gamma correction, which is adopted for captured images in order to cancel out the photoelectric conversion characteristics of CRT display devices.

On the other hand, processing in which the surrounding region is referenced is conversion processing that is performed in reference to not only the pixel value of a target pixel but also to the pixel values of the region surrounding the target pixel or the pixel values of the entire image. A specific example is histogram equalization, in which the distribution of the frequency with which pixel values appear in an input signal is found, and grayscale conversion is performed on the input signal by assigning a wide range of grayscale to frequently appearing grayscale levels in the input image (with histogram equalization, if there is a narrow range of grayscale values that appear frequently in the input signal (for example, a case in which there are 5 to 20 grayscale values in the case of 8-bit data grayscale values), then grayscale conversion is performed to obtain grayscale values over a wide range (for example, 10 to 120 grayscale values) in the output signal). Another specific example is visual processing, in which conversion processing is performed based on the pixel value of the target pixel and the mean value of the pixel values of the surrounding region (mean pixel value).

By applying these grayscale conversions to an input signal, it is possible to obtain a converted signal in which the perception (feeling) of the brightness or the contrast is improved. However, as in the case of gamma correction, when a pixel with a small pixel value is processed with a high gain, the very tiny noise component in the input signal is amplified and the S/N ratio is significantly getting worse. One technology for remedying this issue that has been disclosed is the technology of performing noise reduction processing on the converted signals for pixels with a small pixel value (for example, JP 2001-309177A). With this technology, noise reduction is performed only on pixels in which the slope of the gamma curve, which expresses the input/output characteristics of the grayscale conversion, is greater than a predetermined threshold. As in gamma correction, in cases where the input/output characteristics of the grayscale conversion are determined in advance, those input/output characteristics have monotonically increasing properties, and the slope of the input/output characteristics curve expressing those input/output characteristics has the property of monotonically decreasing, the gain increases the lower the level of the input signal (the level of the input signal with a small grayscale value). Thus pixels in which the S/N ratio becomes poor, that is, pixels with a small pixel value that are processed with a high gain, are specified by detecting input signals that are below the threshold value. By performing noise reduction on the pixels that have been specified in this way, it is possible to improve the deterioration of the S/N ratio in dark areas.

However, with processing in which the surrounding region is referenced, such as histogram equalization and visual processing, the input/output characteristics of the grayscale conversion are changed for each image, or for each pixel, according to the frequency distribution of the pixel values or the mean pixel values around the target pixel of the input signal. When a conventional approach such as gamma correction is adopted in a processing method in which the surrounding region is referenced, it is not possible to pre-calculate the pixel values in which the slope of the input/output characteristics of the grayscale conversion is smaller than a predetermined threshold value, and thus if this is adopted for moving pictures, it is necessary to search the input/output characteristics of the grayscale conversion that are obtained each frame (or each field) or each pixel, and calculate a pixel level (pixel value) of the input signal that corresponds to the threshold value of the slope of the input/output characteristics curve for grayscale conversion that has been obtained. This processing, however, requires a large amount of computations.

In general grayscale conversion, there is no guarantee that the slope of the input/output characteristics curve for the input/output characteristics will decrease monotonically like with gamma correction, and thus with regard to the standard for determining a pixel value in which the slope is equal to or less than the threshold value, there is a possibility that it may not be possible to uniquely determine the range of the pixel levels (pixel values) of the input signal for which to adopt noise reduction.

Threshold processing simply is processing for switching whether or not to adopt noise reduction for a given pixel, and thus it is not possible to carry out noise reduction at a strength that is suited for each pixel.

It is an object of the invention to provide an image processing device, an image processing method, an image processing program, and an integrated circuit with which it is possible to execute noise reduction at a different strength for each target pixel, in accordance with the degree of the deterioration of the S/N ratio due to the amplification of noise components, not only in the case of grayscale conversion where only the target pixel is referenced, but also in the case of grayscale conversion in which the region around the target pixel is referenced also.

SUMMARY OF THE INVENTION

A first aspect of the invention is an image processing device that includes a grayscale conversion portion that performs grayscale conversion on an input signal that is made from pixel data that form an image to obtain a converted signal, a noise reduction degree determining portion that determines a noise reduction degree for the converted signal based on the input signal and the converted signal, and a noise reducing portion that executes noise reduction processing on the converted signal based on the noise reduction degree.

With this image processing device, from the input signal and the converted signal of the pixels it is possible to calculate a noise reduction degree that expresses a strength of the noise reduction processing to be adopted for each converted signal, and then adjust the strength of the noise reduction processing based on the value of the noise reduction degree that has been calculated. Thus, it is possible to perform noise reduction processing that corresponds to the degree to which the noise component is amplified in each pixel due to grayscale conversion.

A second aspect of the invention is the first aspect of the invention, in which the grayscale conversion portion performs grayscale conversion based on histogram information for the grayscale value of the pixel data of the input signal.

With this image processing device, it becomes possible to perform noise reduction processing that corresponds to the degree to which the noise component is amplified in each pixel due to grayscale conversion, even if histogram equalization is used as the method of grayscale conversion, for instance.

A third aspect of the invention is the first aspect of the invention, in which the grayscale conversion portion performs grayscale conversion based on target pixel data of the input signal and a signal that is obtained by performing predetermined processing on surrounding pixel data around the target pixel data.

With this image processing device, it is possible to effect a conversion while keeping noise from being enhanced, even in cases where the visual processing is executed on an input signal. Here, spatial-visual processing refers to processing in which grayscale correction is performed on a target pixel (region) using grayscale characteristics that change according to the brightness of the area around the target pixel (region). For instance, if the grayscale value of the target pixel in the input signal is small (such as an 8-bit grayscale value of 50) and the area surrounding the target pixel is dark (such as an 8-bit grayscale value of 20), then grayscale correction is performed in order to make the grayscale value of the target pixel a large grayscale value (such as an 8-bit grayscale value of 150). Conversely, if the grayscale value of the target pixel in the input signal is small (such as an 8-bit grayscale value of 50) and the area surrounding the target pixel is bright (such as an 8-bit grayscale value of 100), then grayscale correction is performed in order to make the grayscale value of the target pixel a small grayscale value (such as an 8-bit grayscale value of 30). This processing is one example of spatial-visual processing.

A fourth aspect of the invention is the first aspect of the invention, in which the noise reduction degree determining portion determines a noise reduction degree based on a ratio between the input signal and the converted signal.

Thus, it is possible to adjust the strength of the noise reduction processing based on the gain that has been adopted for the input signal.

A fifth aspect of the invention is the first aspect of the invention, in which the noise reduction degree determining portion determines a noise reduction degree based on a ratio between the input signal and the converted signal, and on the input signal.

Thus, it is possible to adjust the strength of the noise reduction processing based on the input signal and the gain that has been adopted for the input signal.

A sixth aspect of the invention is the fifth aspect of the invention, in which the noise reduction degree determining portion sets the noise reduction degree as a first noise reduction degree if a grayscale conversion gain, which is the ratio of the converted signal to the input signal (=(the converted signal)/(the input signal)), is larger than a first gain threshold, and the signal level of the input signal is smaller than a first signal level threshold. The noise reduction degree determining portion also sets the noise reduction degree as a second noise reduction degree, which is a smaller value than the first noise reduction degree, if the grayscale conversion gain is smaller than a second gain threshold, which is a smaller value than the first gain threshold, and the signal level of the input signal is smaller than the first signal level threshold. The noise reduction degree determining portion also sets the noise reduction degree as a third noise reduction degree, which is a smaller value than the first noise reduction degree, if the signal level of the input signal is larger than a second signal level threshold, which is a larger value than the first signal level threshold.

With this image processing device, strong noise reduction processing is executed for pixel data whose input signal level (grayscale value of the pixel data of the input signal) is small and whose grayscale conversion gain is large, and weak noise reduction processing is executed for pixel data whose input signal level is small and whose grayscale conversion gain is small. Further, weak noise reduction is performed for pixel data whose input signal level is large.

Thus, even in cases where pixel data making up a dark region of an image that is formed by the input signal is amplified by a large gain to create an output signal, and that output signal is displayed on a display device, it is possible to improve the brightness or contrast of the region corresponding to those pixel data while suppressing the noise component, on the display screen.

A seventh aspect of the invention is the fifth aspect of the invention, in which the noise reduction degree determining portion sets the gain-based noise reduction degree to a larger value the larger the grayscale conversion gain, which is the ratio of the converted signal to the input signal (=(the converted signal)/(the input signal)), and sets the signal level-based noise reduction degree to a smaller value the larger the signal level of the input signal. The noise reduction degree determining portion also determines a noise reduction degree based on the gain-based noise reduction degree and the signal level-based noise reduction degree.

Thus, it is possible to perform noise reduction processing that corresponds to the grayscale conversion gain and the signal level of the input signal.

It should be noted that here, "setting the gain-based noise reduction degree to a larger value the larger the grayscale conversion gain" refers to a relationship in which, for example, the gain-based noise reduction degree increases monotonically with respect to the change in the grayscale conversion gain. This includes not only a strict monotonic increase but also includes a substantially monotonic increase (it can also include ranges which in part are not monotonically increasing). For example, if the grayscale conversion gain is smaller than a predetermined value (this shall be called a "first gain value"), then the gain-based noise reduction degree is fixed at a predetermined value (this shall be called a "first gain-based noise reduction degree"), and if the grayscale conversion gain is equal to or greater than the first gain value but is equal to or less than a second gain value (which is greater than the first gain value), then the gain-based noise reduction degree is set to a value that monotonically increases with respect to the grayscale conversion gain. If the grayscale conversion gain is larger than the second gain value, then it is set to a value that is larger than the first gain-based noise reduction degree. Such a case also is included.

As the method for determining the noise reduction degree with the noise reduction degree determining portion, it is also possible to use a method in which the mean value (including the arithmetic mean and the geometrical mean) of the gain-based noise reduction degree and the signal level-based noise reduction degree is found and that mean value is established as the noise reduction degree, and a method in which a weighted mean of the gain-based noise reduction degree and the signal level-based noise reduction degree is found and that weighted mean is established as the noise reduction degree. It should be noted that here, the weighted mean is obtained by first finding the smaller of the gain-based noise reduction degree and the signal level-based noise reduction degree (this shall be called "value A" and the larger value shall be called "value B") and assigning a large weight to the value A and a small weight to the value B, and then finding the average of those to obtain the weighted mean. For example, it is possible to find the weighted mean through (weighted mean)=((value A)×3+(value B))/4.

An eighth aspect of the invention is the seventh aspect of the invention, in which the noise reduction degree determining portion sets the smaller of the gain-based noise reduction degree and the signal level-based noise reduction degree as the noise reduction degree.

Thus, even in cases where pixel data making up a dark region of an image that is formed by the input signal is amplified by a large gain to create an output signal, and that output signal is displayed on a display device, it is possible to improve the brightness or contrast of the region corresponding to those pixel data while suppressing the noise component on the display screen.

A ninth aspect of the invention is the fifth aspect of the invention, in which the noise reduction degree determining portion includes a first noise reduction degree calculation portion, a second noise reduction degree calculation portion, and a noise reduction degree output portion. The first noise reduction degree calculation portion outputs a signal level-based noise reduction degree whose value is smaller than when the signal level of the input signal is equal to or less than a predetermined signal level threshold, if the signal level of the input signal is larger than the predetermined signal level threshold. The second noise reduction degree calculation portion outputs a gain-based noise reduction degree whose value is greater than when the grayscale conversion gain is equal to or less than a predetermined gain threshold, if the grayscale conversion gain, which is the ratio of the converted signal to the input signal (=(the converted signal)/(the input signal)), is larger than the predetermined gain threshold. The noise reduction degree output portion sets a value that has been calculated based on the signal level-based noise reduction degree and the gain-based noise reduction degree as the noise reduction degree.

Thus, it is possible to perform noise reduction processing that corresponds to the grayscale conversion gain and the signal level of the input signal.

A tenth aspect of the invention is the ninth aspect of the invention, in which the noise reduction degree output portion sets the smaller of the signal level-based noise reduction degree and the gain-based noise reduction degree as the noise reduction degree.

With this configuration, it is possible to execute strong noise reduction processing for pixel data whose input signal level (grayscale value of the pixel data of the input signal) is small and whose grayscale conversion gain is large, and execute weak noise reduction processing for pixel data whose input signal level is small and whose grayscale conversion gain is small. Further, weak noise reduction can be performed for pixel data whose input signal level is large.

Thus, even in cases where pixel data making up a dark region of an image that is formed by the input signal is amplified by a large gain to create an output signal, and that output signal is displayed on a display device, it is possible to improve the brightness or contrast of the region corresponding to those pixel data while suppressing the noise component on the display screen.

An eleventh aspect of the invention is an image processing device that is provided with a gain calculation portion that calculates a gain for conversion of an input signal that is made from pixel data that form an image, a multiplication portion that multiplies the gain with the input signal to obtain a converted signal, a noise reduction degree determining portion that determines a noise reduction degree for the converted signal based on the gain, and a noise reducing portion that executes noise reduction processing on the converted signal based on the noise reduction degree.

With this configuration, it is possible to calculate a noise reduction degree that expresses a strength of the noise reduction processing to be adopted for each converted signal from the input signal and the gain of the pixels, and then adjust the strength of the noise reduction processing based on the value of the noise reduction degree that has been calculated. Thus, it becomes possible to perform noise reduction processing that corresponds to the degree to which the noise component is amplified in each pixel due to grayscale conversion.

A twelfth aspect of the invention is the eleventh aspect of the invention, in which the noise reduction degree determining portion determines a noise reduction degree for the converted signal based on the input signal as well.

A 13th aspect of the invention is the eleventh aspect of the invention, in which the gain calculation portion calculates the gain based on histogram information for the grayscale values of the pixel data of the input signal.

With this image processing device, it becomes possible to perform noise reduction processing that corresponds to the degree to which the noise component is amplified in each pixel due to grayscale conversion, even if histogram equalization is to be executed, for instance.

A 14th aspect of the invention is the eleventh aspect of the invention, in which the gain calculation portion calculates the gain based on target pixel data of the input signal and a signal that is obtained by performing predetermined processing on surrounding pixel data around the target pixel data.

Thus, it becomes possible to perform noise reduction processing that corresponds to the degree to which the noise component of the pixels is amplified due to grayscale conversion, even in a case where visual processing is to be executed on the input signal.

A 15th aspect of the invention is the 12th aspect of the invention, in which the noise reduction degree determining portion sets the noise reduction degree as a first noise reduction degree if the gain of the converted signal is larger than a first gain threshold, and the signal level of the input signal is smaller than a first signal level threshold. The noise reduction degree determining portion also sets the noise reduction degree as a second noise reduction degree, which is a smaller value than the first noise reduction degree, if the gain is smaller than a second gain threshold, which is a smaller value than the first gain threshold, and the signal level of the input signal is smaller than the first signal level threshold. The noise reduction degree determining portion also sets the noise reduction degree as a third noise reduction degree, which is a smaller value than the first noise reduction degree, if the signal level of the input signal is larger than a second signal level threshold, which is a larger value than the first signal level threshold.

With this image processing device, strong noise reduction processing is executed for pixel data whose input signal level (grayscale value of the pixel data of the input signal) is small and whose signal gain for conversion is large, and weak noise reduction processing is executed for pixel data whose input signal level is small and whose signal gain for conversion is small. Weak noise reduction is also performed for pixel data whose input signal level is large.

Thus, even in cases where pixel data making up a dark region of an image that is formed by the input signal are amplified by a large gain to create an output signal, and that output signal is displayed on a display device, it is possible to improve the brightness or contrast of the region corresponding to those pixel data while suppressing the noise component on the display screen.

A 16th aspect of the invention is the 12th aspect of the invention, in which the noise reduction degree determining portion sets a gain-based noise reduction degree to a larger value the larger gain, sets a signal level-based noise reduction degree to a smaller value the larger the signal level of the input signal, and determines the noise reduction degree based on the gain-based noise reduction degree and the signal level-based noise reduction degree.

Thus, it is possible to perform noise reduction processing that corresponds to the grayscale conversion gain and the signal level of the input signal.

It should be noted that here, "setting the gain-based noise reduction degree to a larger value the larger the gain" refers to a relationship in which, for example, the gain-based noise reduction degree increases monotonically with respect to the change in the gain. This includes not only a monotonic increase in a strict sense but also includes a substantially monotonic increase (it can also include ranges which in part are not monotonically increasing). For example, if the gain is smaller than a predetermined value (this shall be called a "third gain value"), then the gain-based noise reduction degree is fixed at a predetermined value (this shall be called a "third gain-based noise reduction degree"), and if the gain is equal to or greater than the third gain value but is equal to or less than a fourth gain value (greater than the third gain value), then the gain-based noise reduction degree is set to a value that monotonically increases with respect to the gain. If the gain is larger than the fourth gain value, then it is set to a value that is larger than the third gain-based noise reduction degree. Such a case also is included.

As the method for determining the noise reduction degree with the noise reduction degree determining portion, it is also possible to use a method in which the mean value (including the arithmetic mean and the geometrical mean) of the gain-based noise reduction degree and the signal level-based noise reduction degree is found and that mean value is established as the noise reduction degree, and a method in which a weighted mean of the gain-based noise reduction degree and the signal level-based noise reduction degree is found and that weighted mean is established as the noise reduction degree.

A 17th aspect of the invention is the 16th aspect of the invention, in which the noise reduction degree determining portion sets the smaller of the gain-based noise reduction degree and the signal level-based noise reduction degree as the noise reduction degree.

Thus, even in cases where pixel data making up a dark region of an image that is formed by the input signal are amplified by a large gain to create an output signal, and that output signal is displayed on a display device, it is possible to improve the brightness or contrast of the region corresponding to those pixel data while suppressing the noise component on the display screen.

An 18th aspect of the invention is the 12th aspect of the invention, in which the noise reduction degree determining portion includes a first noise reduction degree calculation portion, a second noise reduction degree calculation portion, and a noise reduction degree output portion. The first noise reduction degree calculation portion outputs a signal level-based noise reduction degree whose value is smaller than when the signal level of the input signal is equal to or less than a predetermined signal level threshold, if the signal level of the input signal is larger than the predetermined signal level threshold. The second noise reduction degree calculation portion outputs a gain-based noise reduction degree whose value is greater than when the gain is equal to or less than a predetermined gain threshold, if the gain is larger than the predetermined gain threshold. The noise reduction degree output portion sets a value that has been calculated based on the signal level-based noise reduction degree and the gain-based noise reduction degree as the noise reduction degree.

Thus, it is possible to perform noise reduction processing that corresponds to the grayscale conversion gain and the signal level of the input signal.

A 19th aspect of the invention is the 18th aspect of the invention, in which the noise reduction degree output portion sets the smaller of the signal level-based noise reduction degree and the gain-based noise reduction degree as the noise reduction degree.

With this image processing device, strong noise reduction processing is executed for pixel data whose input signal level (grayscale value of the pixel data of the input signal) is small and whose signal gain for conversion is large, and weak noise reduction processing is executed for pixel data whose input signal level is small and whose signal gain for conversion is small. Weak noise reduction is also performed for pixel data whose input signal level is large.

Thus, even in a case where pixel data making up a dark region of an image that is formed by the input signal are amplified by a large gain to create an output signal, and that output signal is displayed on a display device, it is possible to improve the brightness or contrast of the region corresponding to those pixel data while suppressing the noise component on the display screen.

A 20th aspect of the invention is an image processing method that includes a grayscale conversion step of performing grayscale conversion on an input signal that is made from pixel data that form an image to obtain a converted signal, a noise reduction degree determining step of determining a noise reduction degree for the converted signal based on the input signal and the converted signal, and a noise reducing step of executing noise reduction processing on the converted signal based on the noise reduction degree.

With this configuration, from the input signal and the converted signal of each pixel it is possible to calculate a noise reduction degree that expresses a strength of the noise reduction processing to be adopted for each converted signal, and then adjust the strength of the noise reduction processing based on the value of the noise reduction degree that has been calculated. Thus, it becomes possible to perform noise reduction processing that corresponds to the degree to which the noise component is amplified in each pixel due to grayscale conversion.

A 21st aspect of the invention is an image processing method that includes a gain calculation step of calculating a gain for converting an input signal that is made from pixel data that form an image, a multiplication step of multiplying the gain with the input signal to obtain a converted signal, a noise reduction degree determining step of determining a noise reduction degree for the converted signal based on the gain, and a noise reducing step of executing noise reduction processing on the converted signal based on the noise reduction degree.

With this configuration, it is possible to calculate a noise reduction degree that expresses a strength of the noise reduction processing to be adopted for each converted signal from the input signal and the gain of the pixels, and then adjust the strength of the noise reduction processing based on this value. Thus, it becomes possible to perform noise reduction processing that corresponds to the degree to which the noise component is amplified in each pixel due to grayscale conversion.

A 22nd aspect of the invention is the 21st aspect of the invention, in which in the noise reduction degree determining step, a noise reduction degree for the converted signal is determined based on the input signal as well.

A 23rd aspect of the invention is an image processing program for causing a computer to execute a grayscale conversion step of performing grayscale conversion on an input signal that is made from pixel data that form an image to obtain a converted signal, a noise reduction degree determining step of determining a noise reduction degree for the converted signal based on the input signal and the converted signal, and a noise reducing step of executing noise reduction processing on the converted signal based on the noise reduction degree.

With this configuration, from the input signal and the converted signal of the pixels it is possible to calculate a noise reduction degree that expresses a strength of the noise reduction processing to be adopted for each converted signal, and then adjust the strength of the noise reduction processing based on that value. Thus, it becomes possible to perform noise reduction processing that corresponds to the degree to which the noise component is amplified in each pixel due to grayscale conversion.

A 24th aspect of the invention is an image processing program for causing a computer to execute a gain calculation step of calculating a gain for converting an input signal that is made from pixel data that form an image, a multiplication step of multiplying the gain with the input signal to obtain a converted signal, a noise reduction degree determining step of determining a noise reduction degree for the converted signal based on the gain, and a noise reducing step of executing noise reduction processing on the converted signal based on the noise reduction degree.

With this configuration, it is possible to calculate a noise reduction degree that expresses a strength of the noise reduction processing to be adopted for each converted signal from the input signal and the gain of the pixels, and then adjust the strength of the noise reduction processing based on the value of the noise reduction degree that has been calculated. Thus, it becomes possible to perform noise reduction processing that corresponds to the degree to which the noise component is amplified in each pixel due to grayscale conversion.

A 25th aspect of the invention is the 24th aspect of the invention, in which in the noise reduction degree determining step, a noise reduction degree for the converted signal is determined based on the input signal as well.

A 26th aspect of the invention is an integrated circuit that is provided with a grayscale conversion portion that performs grayscale conversion on an input signal that is made from pixel data that form an image to obtain a converted signal, a noise reduction degree determining portion that determines a noise reduction degree for the converted signal based on the input signal and the converted signal, and a noise reducing portion that executes noise reduction processing on the converted signal based on the noise reduction degree.

Thus, it is possible to achieve an integrated circuit that achieves the same effects as the first aspect of the invention.

A 27th aspect of the invention is an integrated circuit that includes a gain calculation portion that calculates a gain for conversion of an input signal that is made from pixel data that form an image, a multiplication portion that multiplies the gain with the input signal to obtain a converted signal, a noise reduction degree determining portion that determines a noise reduction degree for the converted signal based on the gain, and a noise reducing portion that executes noise reduction processing on the converted signal based on the noise reduction degree.

Thus, it is possible to achieve an integrated circuit that achieves the same effects as the eleventh aspect of the invention.

With this invention, it is possible to provide an image processing device, an image processing method, an image processing program, and an integrated circuit with which it is possible to execute noise reduction processing at a different strength for each target pixel, in accordance with the degree of the deterioration of the S/N ratio due to amplification of noise components, not only in the case of grayscale conversion in which only the target pixel is referenced, but also in the case of grayscale conversion in which the region surrounding the target pixel is also referenced.

Consequently, with the invention it is possible to convert the grayscale of an input signal without amplifying noise components.

Figure 1:
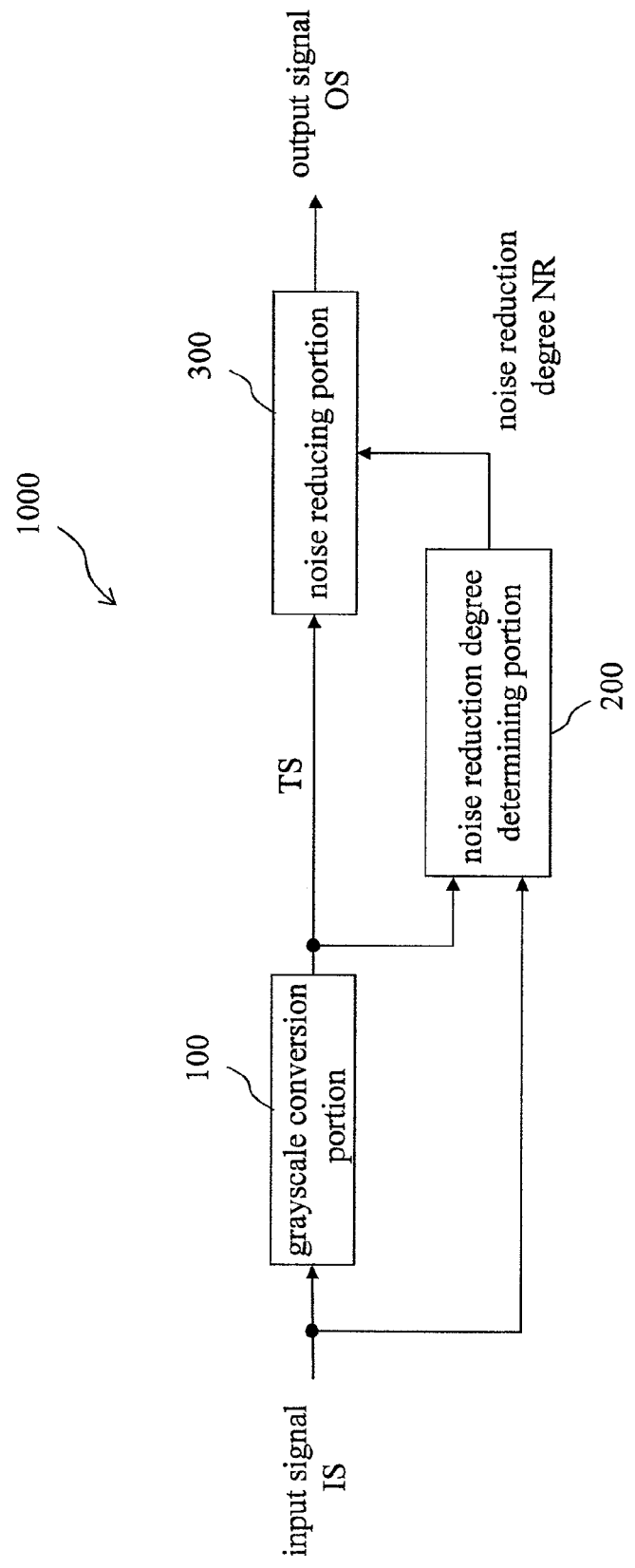
FIG. 1 is a block diagram of the image processing device according to a first embodiment of the invention.

EXPLANATION OF THE REFERENCE NUMERALS 1000, 2000 image processing device
100, 150 grayscale conversion portion
101 histogram calculation portion
102 input/output characteristics determining portion 103 grayscale processing portion
110, 160 gain calculation portion
112 grayscale conversion gain characteristics determining portion
113 grayscale processing gain calculation portion
120 multiplication portion
151 spatial processing portion
152 visual processing portion
162 visual processing gain calculation portion
200, 210 noise reduction degree determining portion
201 first noise reduction degree calculation portion
202 division portion
203, 213 second noise reduction degree calculation portion
204 minimum value output portion
300 noise reducing portion
301 smoothing portion
302 interpolation portion

DETAILED DESCRIPTION OF THE PREFERRED EMBODIMENTS

Below, embodiments of the invention are described in detail with reference to the drawings.

First Embodiment

Figure 2:
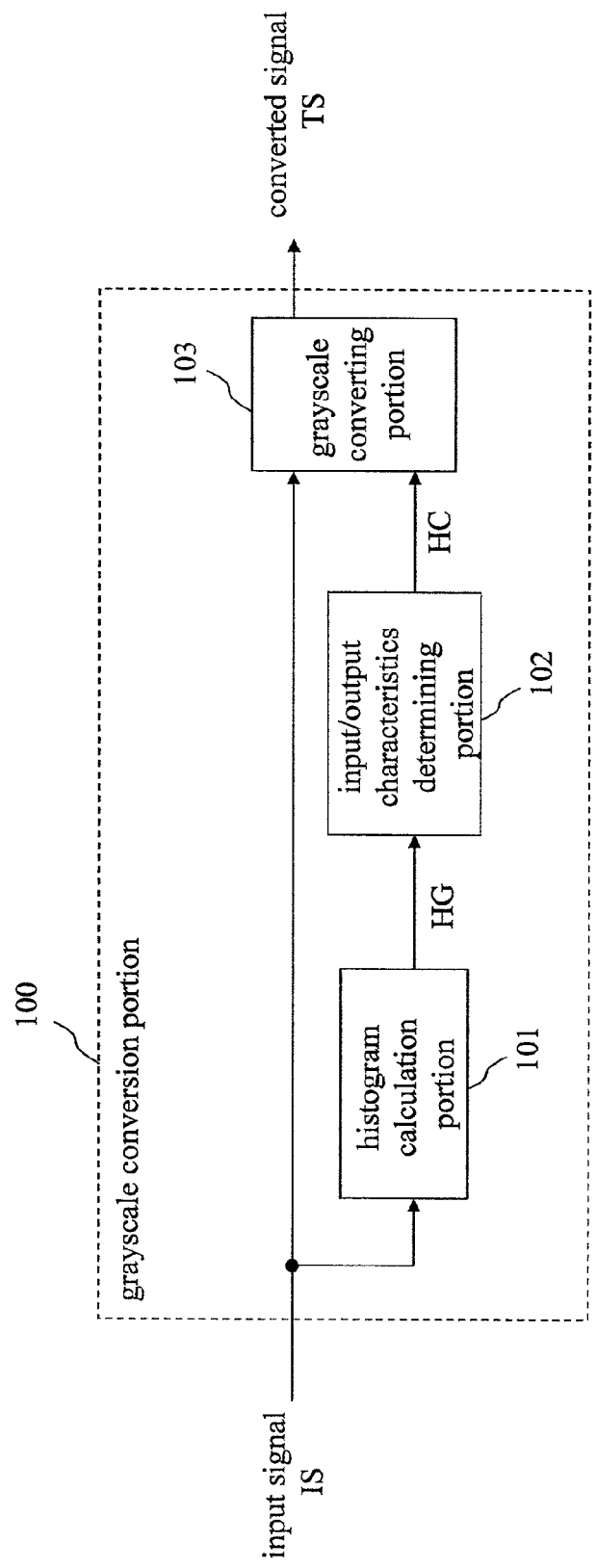
FIG. 2 is a block diagram of the grayscale conversion portion of the first embodiment.
Figure 3:
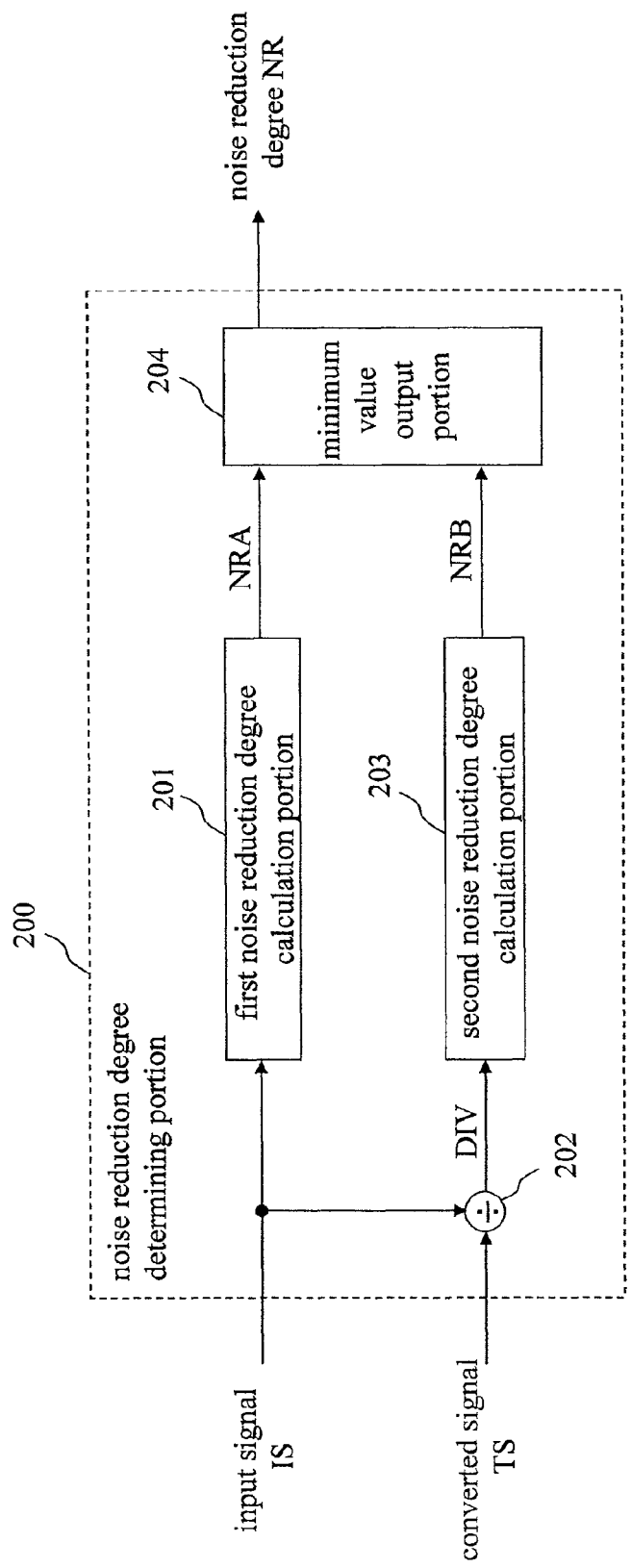
FIG. 3 is a block diagram of the noise reduction degree determining portion of the first embodiment.

An image processing device according to a first embodiment of the invention is described using FIGS. 1 through 3.

FIG. 1 is a block diagram that shows the configuration of an image processing device 1000 according to the first embodiment of the invention.

As shown in FIG. 1, the image processing device 1000 is provided with a grayscale conversion portion 100 for calculating a converted signal TS from an input signal IS, a noise reduction degree determining portion 200 for determining a noise reduction degree NR based on the input signal IS and the converted signal TS, and a noise reducing portion 300 that performs noise reduction processing on the converted signal TS based on the noise reduction degree NR to obtain an output signal OS.

With this configuration, the noise reduction degree determining portion 200 determines the noise reduction degree to be applied to each pixel based on the degree that the noise component is amplified by the grayscale conversion portion 100, and the noise reducing portion 300 can execute noise reduction based on the noise reduction degree NR that has been calculated by the noise reduction degree determining portion 200. Thus, an image that has preferable grayscale characteristics can be reproduced without amplifying the noise component when converting the grayscale of an input signal.

The various functional portions of FIG. 1 are described below.

The grayscale conversion portion 100 inputs an input signal IS and performs grayscale conversion on the input signal IS to correct the brightness or contrast, creating a converted signal TS, and outputs the converted signal TS to the noise reduction degree determining portion 200 and the noise reducing portion 300. It is possible to adopt histogram equalization for the grayscale conversion by the grayscale conversion portion 100, in which grayscale conversion of the input signal IS is performed based on the histogram information of the entire image. FIG. 2 is a block diagram showing the configuration of a grayscale conversion portion 100 that executes grayscale conversion through histogram equalization.

As shown in FIG. 2, first a histogram calculation portion 101 calculates histogram information HG from the input signal IS and outputs the histogram information HG to an input/output characteristics determining portion 102. Next, the input/output characteristics determining portion 102 inputs the histogram information HG, and based on the histogram information HG that has been calculated by the histogram calculation portion 101, determines the input/output characteristics HC such that a wide range of grayscale is assigned to the grayscale levels (grayscale values) that appear with high frequency. The input/output characteristics determining portion 102 then outputs the data making up the input/output characteristics HC to a grayscale processing portion 103.

Here, the grayscale processing portion 103 inputs the data making up the input/output characteristics HC and converts the input signal IS of a target pixel based on the input/output characteristics HC that have been calculated by the input/output characteristics determining portion 102, yielding a converted signal TS. The grayscale processing portion 103 outputs the converted signal TS that has been obtained to the noise reducing portion 300 and the noise reduction degree determining portion 200.

It should be noted that the method of the grayscale conversion is not limited to a method that is achieved by the grayscale conversion portion 100 shown in FIG. 2. Further, the configuration of the grayscale conversion portion 100 is not limited to the configuration that is shown in FIG. 2.

Modified Example

Spatial—Visual Processing

A modified example using a grayscale conversion method that is separate from the grayscale conversion method discussed above is described as the grayscale conversion method.

The grayscale conversion method according to the modified example shown here is a visual processing method in which grayscale conversion is performed based on the target pixel of the input signal and a signal obtained by performing a predetermined processing on the pixels surrounding the target pixel.

Figure 7:
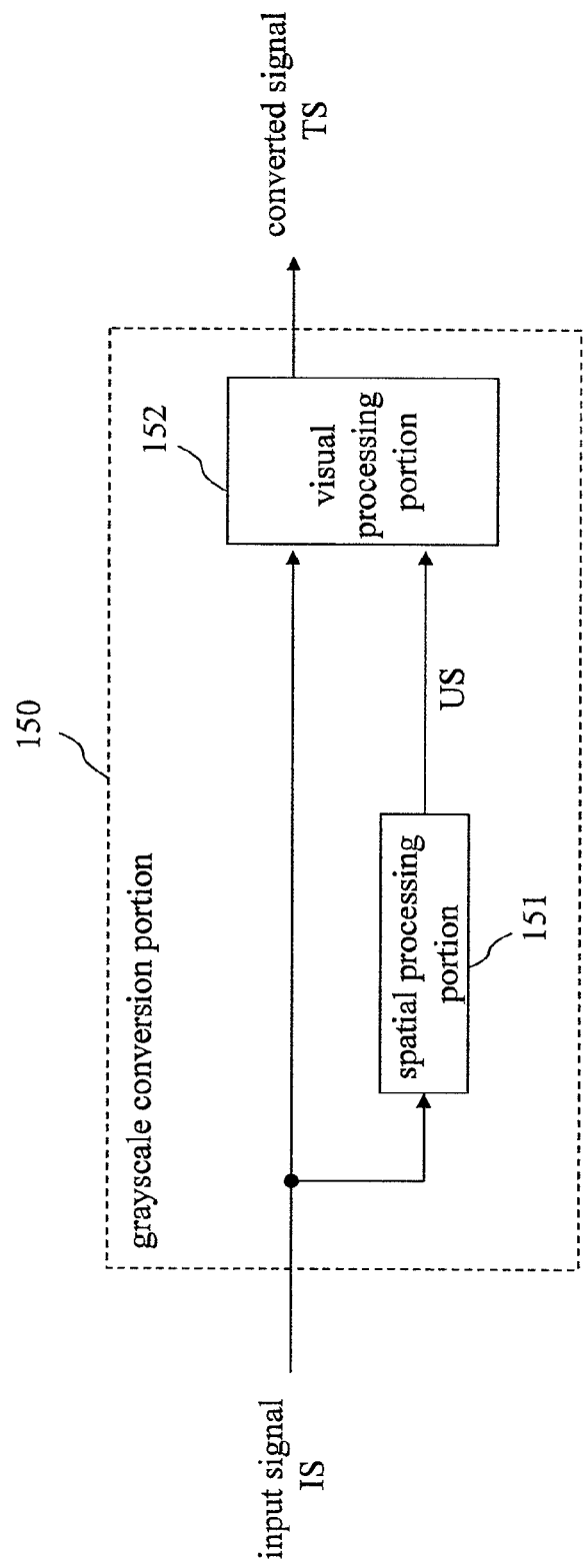
FIG. 7 is a block diagram of a modified example of the grayscale conversion portion of the first embodiment.

FIG. 7 is a block diagram showing the configuration of a grayscale conversion portion 150 that performs grayscale conversion through visual processing according to the modified example. As shown in FIG. 7, the grayscale conversion portion 150 is provided with a spatial processing portion 151 that extracts a surrounding image signal US that includes the surrounding image information from the input signal IS, and a visual processing portion 152 that calculates a converted signal TS that is obtained by visually processing the input signal IS according to the surrounding image signal US.

Here, the spatial processing portion 151 performs filter processing on the target pixel and the surrounding pixels of the input signal IS. The spatial processing portion 151 for example calculates the surrounding image signal US by executing the following low-pass filter on the target pixel and the surrounding pixels of the input signal IS.

$$US = (\Sigma[Wij] \times [Aij]) \div (\Sigma[Wij])$$

Here, [Wij] is the weight coefficient of the pixel located in the i-th row j-th column of a matrix of the target pixel and surrounding pixels, and [Aij] is the pixel value of the pixel that is located in the i-th row j-th column of a matrix of the target pixel and surrounding pixels. The symbol $\Sigma$ means to take the sum of the values for the target pixel and the surrounding pixels (calculate the sum of the series).

It should be noted that it is possible to assign a weight coefficient with a smaller value the larger the absolute value of the difference between the pixel values, and it is also possible to assign a smaller weight coefficient the greater the distance from the target pixel.

Next, the visual processing portion 152 inputs the input signal IS and the surrounding image signal US, which is the output from the spatial processing portion, and creates and outputs a converted signal TS by converting the grayscale of the input signal IS in accordance with the surrounding image signal US. The visual processing portion 152 for example can perform grayscale conversion based on the two-dimensional grayscale conversion characteristics shown in FIG. 8. Here, two-dimensional grayscale conversion refers to grayscale conversion in which the value of the output is determined for both the surrounding image signal US and the input signal IS.

Figure 8:
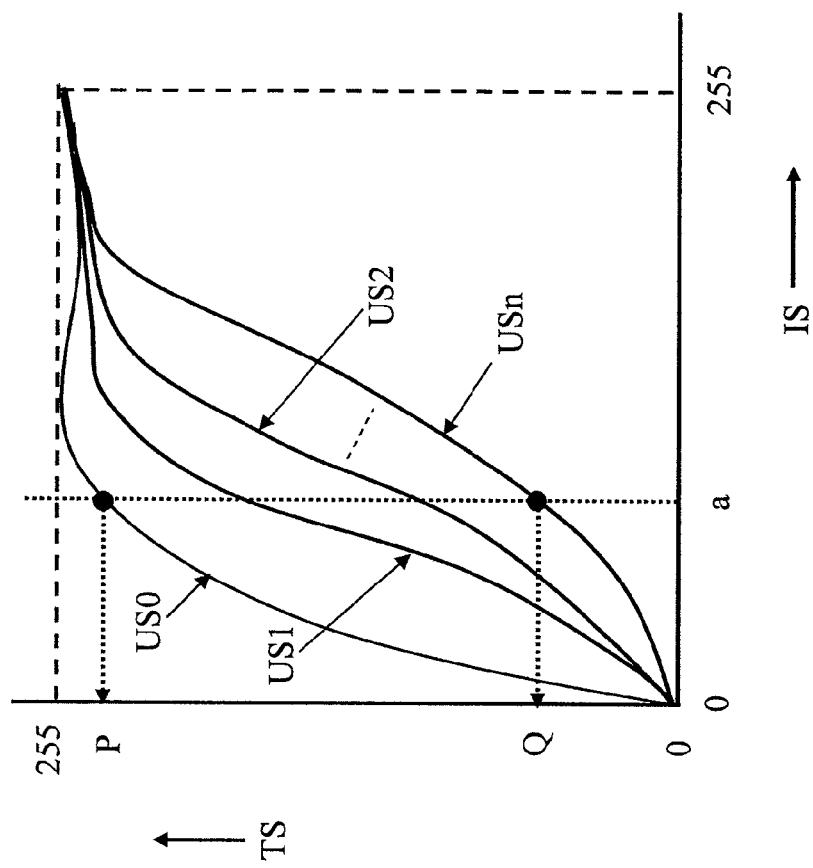
FIG. 8 is a diagram that shows the relationship between the input signal and the converted signal in the visual processing in the first embodiment.

FIG. 8 shows a graph of the two-dimensional grayscale conversion characteristics. In FIG. 8, the horizontal axis is the pixel value (grayscale value) of the input signal IS, and the vertical axis is the pixel value (grayscale value) of the converted signal TS. It should be noted that in FIG. 8, the input signal and the converted signal TS are 8-bit signals whose pixel values (grayscale values) are in the range of 0 to 255.

As shown in FIG. 8, two-dimensional grayscale conversion has predetermined two-dimensional grayscale conversion characteristics that depend on the signal level (grayscale value) of the surrounding image signal US, or on US0 to USn (where n is an integer that correlates with the signal level (grayscale value)). That is, two-dimensional grayscale conversion is achieved by converting the input signal IS (the grayscale value of IS) into the converted signal TS (the grayscale value of TS) with a grayscale conversion curve that has been selected from among the grayscale conversion curves US0 to USn based on the signal level (grayscale level) of the surrounding image signal US. For example, the grayscale conversion curve US1 of FIG. 8 is selected when the level (grayscale value) of the US signal is 1, and the grayscale conversion curve US120 is selected when the level (grayscale value) of the US signal is 120. However, it is not absolutely necessary to prepare the same number of gain conversion curves US0 to USn as the number of grayscale values of the US signal, and it is also possible to for example prepare a smaller number of gain conversion curves US0 to USn than the number of grayscale values of the US signal, and for the gain conversion curves that have not been readied, to achieve two-dimensional gain conversion by calculating a grayscale conversion curve that corresponds to the grayscale value of the US signal through interpolation of the gain conversion curves that have been prepared.

For example, if the surrounding image signal US is an 8-bit value, then in two-dimensional grayscale conversion, the grayscale conversion characteristics are separated into 256 levels and each of these is expressed as a grayscale conversion curve that has predetermined gamma conversion characteristics.

As shown in FIG. 8, the grayscale conversion characteristics are expressed by a plurality of grayscale conversion curves having predetermined gamma conversion characteristics, and the plurality of grayscale conversion curves have a relationship where the output monotonically decreases along with the subscript of the surrounding image signal US (if the grayscale value of the input signal is the same value, then the grayscale value that is output becomes a smaller value the larger the subscript (number) of the surrounding image signal US). It should be noted that the "relationship where the output monotonically decreases" is not limited to a monotonically decreasing relationship in a strict sense, and even if there are places where the output partially does not monotonically decrease along with the subscript of the surrounding image signal US, it is sufficient for it to be substantially monotonically decreasing.

As shown in FIG. 8, the two-dimensional grayscale conversion characteristics satisfy the relationship of (the output value when US=US0)≥(the output value when US=US1)≥ . . . ≥(the output value when US=USn) with respect to the grayscale value of the pixel of all input signals IS. The contrast of the local region is enhanced by this grayscale conversion characteristic.

With the two-dimensional grayscale conversion characteristics shown in FIG. 8, when the image signal IS value (grayscale value) is "a," the visual processing portion 152 can take a value from "P" to "Q" for the grayscale value of the converted signal TS, based on the surrounding image signal US. That is, even if the input signal IS value (grayscale value) is "a," the value (grayscale value) of the converted signal TS that is output may vary significantly between the value "P" and the value "Q" depending on the surrounding image signal US.

As described above, the grayscale conversion portion 150 of the modified example makes it possible to execute grayscale conversion that corresponds to the surrounding image information for each pixel in the image.

Next, the noise reduction degree determining portion 200 inputs the input signal IS and the converted signal TS, and from the input signal IS and the converted signal TS calculates a noise reduction degree NR that expresses the strength of the noise reduction processing to be executed on the converted signal TS. The noise reduction degree determining portion 200 then outputs the noise reduction degree NR that it has calculated to the noise reducing portion 300. In general, noise components are amplified more significantly the smaller the signal level (grayscale value) of the input signal IS for the pixel and the larger the gain value that has been used to convert the grayscale of the pixel. Thus, it is preferable to execute stronger noise reduction processing the smaller the signal level (grayscale value) of the input signal IS and the larger the gain of the grayscale conversion, that is, the ratio between the converted signal TS and the input signal IS(= (grayscale value of converted signal TS)/(grayscale value of input signal IS)).

Hereinafter, the noise reduction degree NR is described as taking an (real) value from 0 to 1, in which the larger the value, the stronger the noise reduction processing that is performed.

FIG. 3 shows a block diagram of the noise reduction degree determining portion 200 for performing processing to calculate the noise reduction degree NR.

As shown in FIG. 3, the noise reduction degree determining portion 200 is primarily made of a first noise reduction degree calculation portion 201 for calculating a first noise reduction degree NRA from the input signal IS, a division portion 202 for calculating a ratio DIV between the converted signal TS and the input signal IS (=(grayscale value of TS)/ (grayscale value of IS)), a second noise reduction degree calculation portion 203 for calculating a second noise reduction degree NRB from the value of the ratio DIV that has been calculated, and a minimum value output portion 204 that serves as the noise reduction degree determining portion and outputs the smaller of the first noise reduction degree NRA and the second noise reduction degree NRB.

Figure 4:
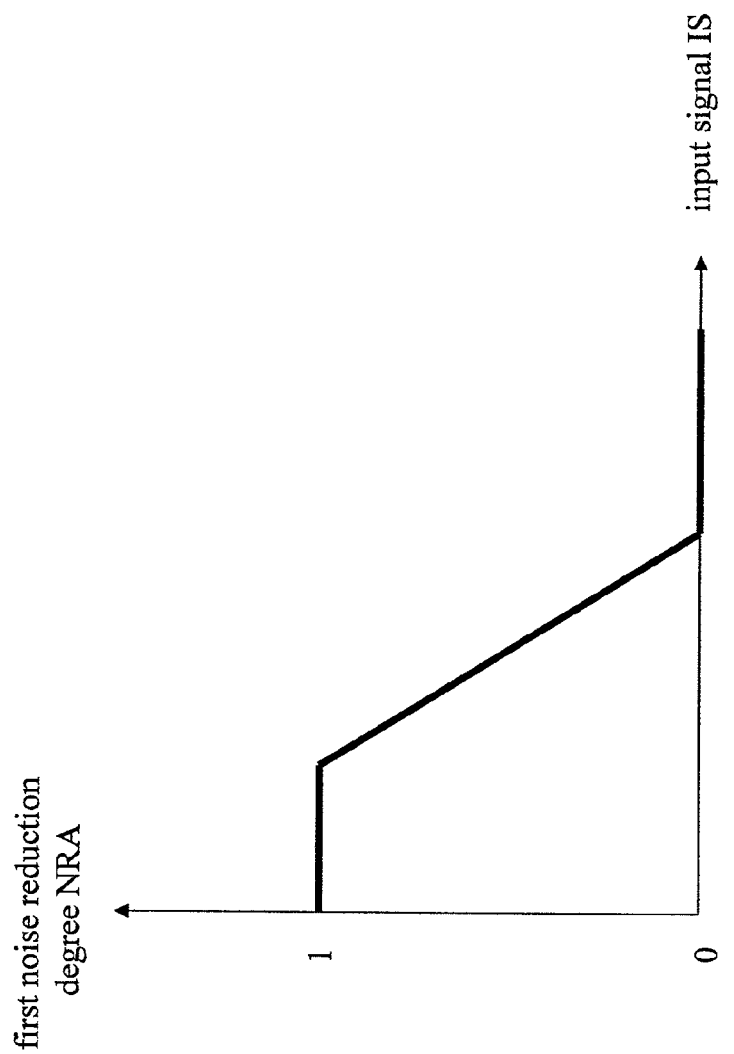
FIG. 4 is a diagram that shows the relationship between the input signal and the first noise reduction degree in the first noise reduction degree calculation portion of the first embodiment.

Here, it is desirable for the first noise reduction degree calculation portion 201 to execute stronger noise reduction processing the smaller the signal level (grayscale value) of the pixel, and thus it preferably outputs a larger noise reduction degree NRA the smaller the signal level (grayscale value) of the input signal IS. FIG. 4 shows an example of these properties.

Figure 5:
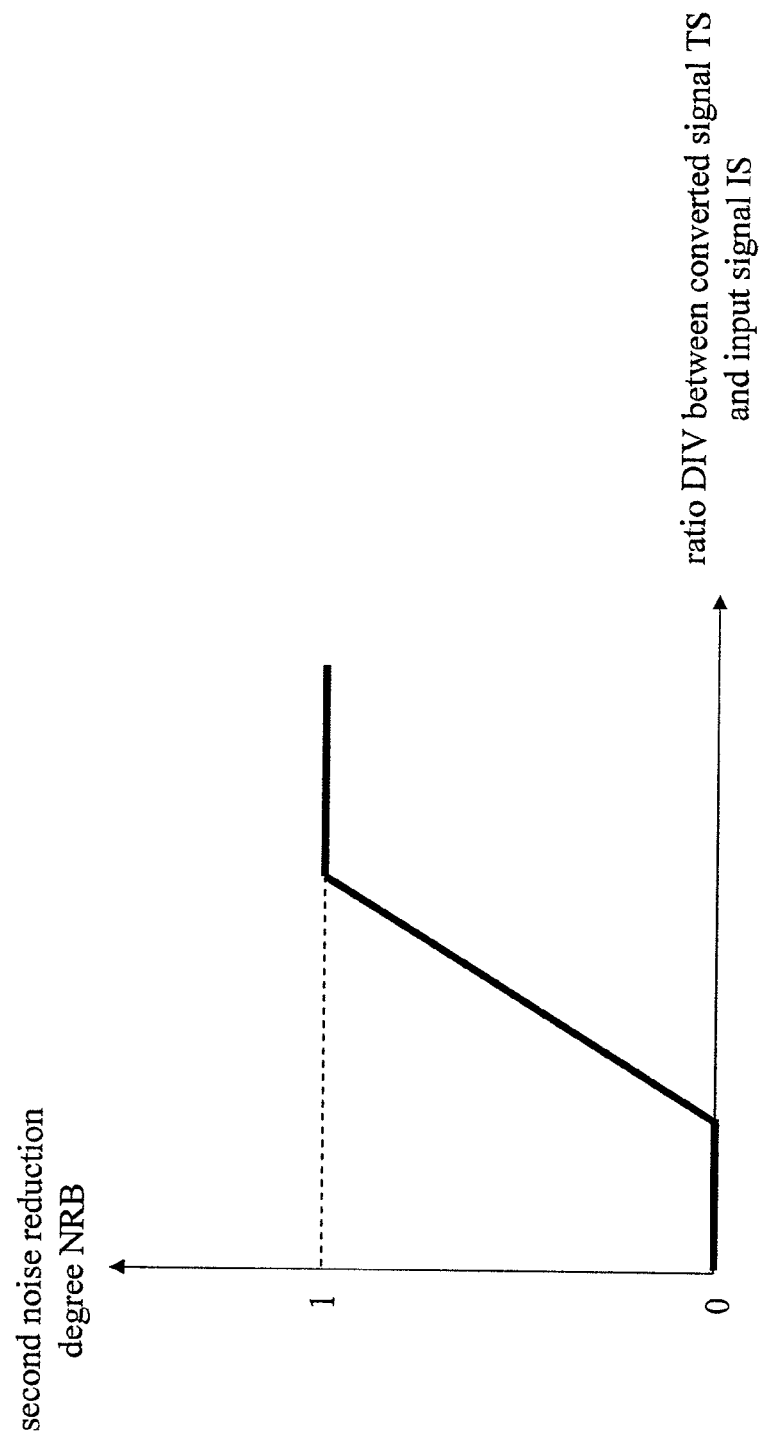
FIG. 5 is a diagram that shows the relationship between the ratio between the converted signal and the input signal and the second noise reduction degree in the second noise reduction degree calculation portion of the first embodiment.

On the other hand, because it is desirable for the second noise reduction degree calculation portion 203 to execute stronger noise reduction the higher the gain that has been used to convert the grayscale of the pixel, preferably it outputs a larger noise reduction degree NRB the larger the ratio DIV between the converted signal TS and the input signal IS. FIG. 5 shows an example of these properties.

Next, the minimum value output portion 204 outputs the smaller of the first noise reduction degree NRA that has been calculated by the first noise reduction degree calculation portion 201 and the second noise reduction degree NRB that has been calculated by the second noise reduction degree calculation portion 203, and thus it is possible to calculate a larger noise reduction degree NR the smaller the signal level (grayscale level) of the input signal IS for the pixel and the larger the gain that has been used to convert the grayscale of the pixel. The noise reduction degree determining portion 200 outputs the noise reduction degree NR that has been calculated to the noise reducing portion 300.

It should be noted that the processing by the minimum value output portion 204 is not limited to the processing described above, and for example it may also be processing in which the mean value (including the arithmetic mean and the geometrical mean) of the first noise reduction degree NRA and the second noise reduction degree NRB is found and that mean value is taken as the noise reduction degree NR, and processing in which the weighted mean of the first noise reduction degree NRA and the second noise reduction degree NRB is found and that weighted mean is taken as the noise reduction degree NR. Here, the weighted mean is obtained by first finding the smaller of the two values for the first noise reduction degree NRA and the second noise reduction degree NRB (this smaller value shall be called "value A" and the larger value shall be called "value B") and assigning a large weight to the value A and a small weight to the value B, and then averaging these to obtain the weighted mean. For example, it is possible to find the weighted mean through the equation (weighted mean)=((value A)×3+(value B))/4.

Figure 6:
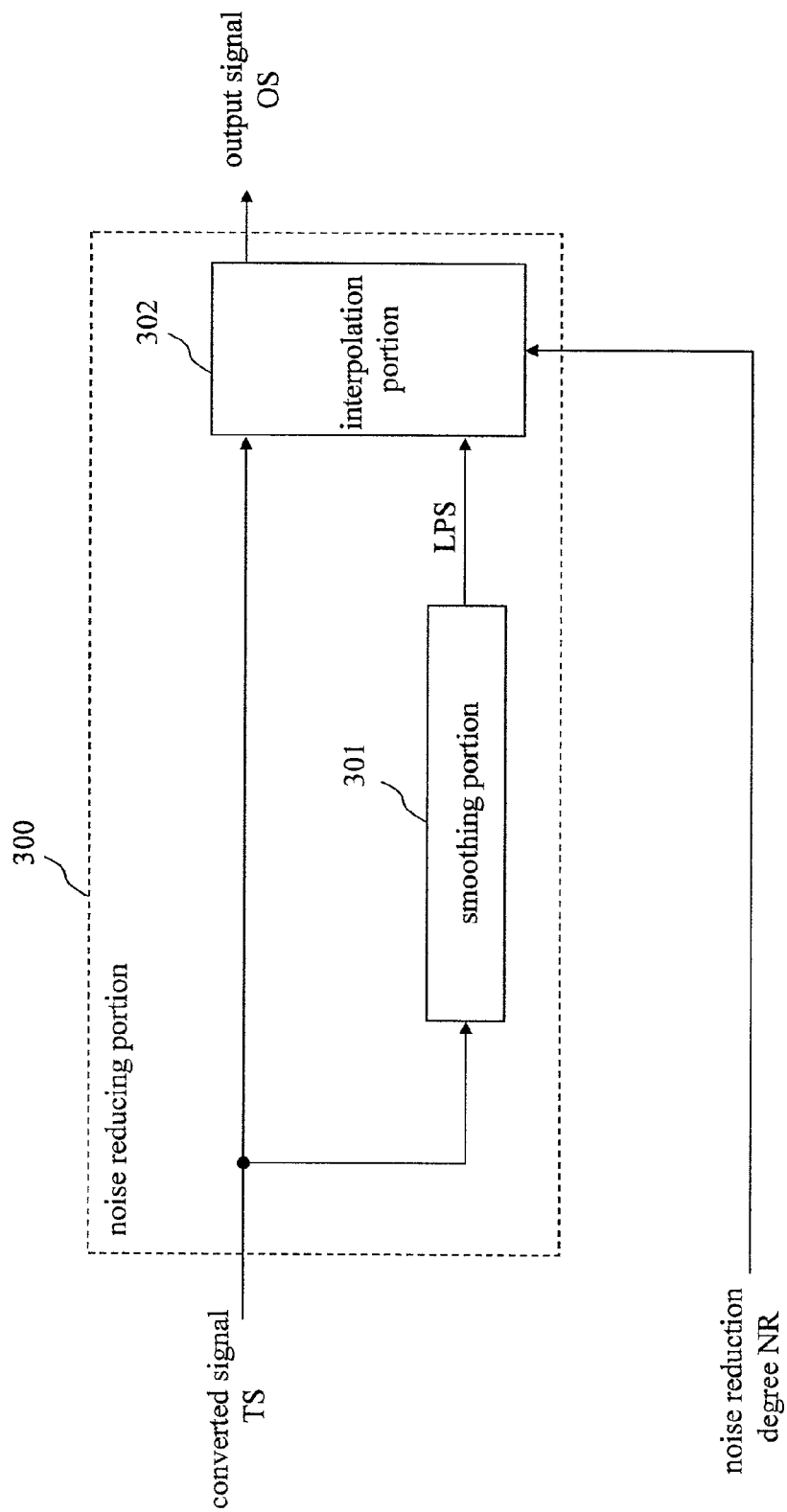
FIG. 6 is a block diagram of the noise reducing portion of the first embodiment.

Next, the noise reducing portion 300 performs noise reduction processing on the converted signal TS based on the noise reduction degree NR. FIG. 6 shows an example of the configuration of the noise reducing portion 300 for adjusting the strength of the noise reduction processing based on the noise reduction degree NR.

As shown in FIG. 6, the noise reducing portion 300 is primarily made of a smoothing portion 301 for smoothing the converted signal TS to obtain a smoothed signal LPS, and an interpolation portion 302 for interpolating the converted signal TS and the smoothed signal LPS based on the noise reduction degree NR in order to obtain an output signal OS.

Here, the smoothing portion 301 can be achieved by applying a low-pass filter, for example, to a plurality of pixels surrounding a target pixel.

The interpolation by the interpolation portion 302 can be achieved through the interpolation of the following equation, using the noise reduction degree NR that has been calculated by the noise reduction degree determining portion 200.

$$OS = LPS \times NR + TS \times (1-NR)$$

According to this equation, when the noise reduction degree NR is large, the resulting output is a value in which the smoothed signal LPS is weighted heavily, yielding a result (output) in which the noise has been strongly eliminated. Conversely, when the noise reduction degree NR is small, the resulting output is a value in which the converted signal TS is weighted heavily, yielding a result (output) in which the noise has been weakly eliminated.

Noise tends to stand out on the display screen in cases where an output signal OS that is obtained by applying a large gain to an input signal IS that corresponds to a target pixel with a small grayscale value (such a target pixel is displayed dark on the display screen) is displayed on a display device.

In other words, an input signal IS that corresponds to a target pixel with a small grayscale value has a small signal level (grayscale value) for the target pixel, and thus assuming an equal noise component, the S/N ratio is poor compared to a case in which the signal level (grayscale value) of the target pixel is large. Thus, when an output signal OS that has been obtained by amplifying this signal with a poor S/N ratio is displayed on a display device, the display has a poor S/N ratio and noise stands out easily.

Even if processing that causes blurring (such as processing in which LPF is applied) is executed on a target pixel with a small grayscale value, it is difficult to sense a deterioration in terms of the visual characteristics on the display screen.

Thus, it is preferable to perform strong noise reduction on regions that correspond to pixels with a small grayscale value, and on regions that have been amplified with a large gain.

On the other hand, an input signal IS that corresponds to a target pixel with a large grayscale value has a large signal level (grayscale value) for the target pixel, and thus assuming an equal noise component, the S/N ratio is good compared to a case in which the signal level (grayscale value) of the target pixel is small. Thus, if this is amplified by a large gain, noise does not stand out easily on the display screen.

Conversely, when processing that causes blurring (such as processing in which LPF is applied) is executed on a target pixel with a large grayscale value, it is easy to sense a deterioration in the visual characteristics on the display screen.

Thus, it is preferable that weak noise reduction is performed on regions that correspond to pixels with a large grayscale value.

The characteristics shown in FIG. 4, the characteristics shown in FIG. 5, and the configuration of the noise reduction degree determining portion 200 are determined based on the above principles. It should be noted that it goes without saying that the characteristics shown in FIG. 4, the characteristics shown in FIG. 5, and the configuration of the noise reduction degree determining portion 200 can be altered as long as they are altered based on the above principles.

As described above, with the image processing device 1000 according to this embodiment, the degree to which the noise component of each pixel is amplified can be found from the signal level (grayscale value) of the input signal IS and the value of the gain if the input signal IS is grayscale converted to the converted signal TS, and thus by performing noise reduction at a suitable strength based on the degree to which the noise component will be amplified, it is possible to obtain an output signal OS whose noise component has been suppressed and which has preferable grayscale characteristics. With the image processing device 1000 according to the embodiment, it is possible to execute preferable grayscale conversion on an input signal IS without amplifying the noise component of the input signal IS, and output the result as the output signal OS, and thus by displaying the output signal OS that is output from the image processing device 1000 according to this embodiment on a display device (not shown) as an image (video picture), it is possible to reproduce an image (video picture) that has preferable grayscale characteristics.

It should be noted that it is also possible for the noise reduction degree NR to be calculated from only the ratio DIV of the converted signal TS and the input signal IS. Thus, it is possible to execute strong noise reduction on all pixels that have been processed with a high gain, regardless of the value of the input signal IS.

It is also possible for the noise reduction degree NR to be calculated based on the difference between the converted signal TS and the input signal IS. Thus, it is possible to execute strong noise reduction on pixels in which the converted signal TS is significantly higher than the input signal IS.

It should be noted that that the strength of the noise reduction processing by the noise reducing portion 300 can be adjusted by changing the filter coefficient of the low-pass filter that is applied to the converted signal TS. Thus, it is possible to adjust the degree to which high-frequency components are reduced by the low-pass filter, and the degree to which the noise is reduced can be adjusted.

Second Embodiment

An image processing device according to a second embodiment of the invention is described using FIGS. 9 through 14.

In the image processing device 1000 according to the first embodiment of the invention, once a converted signal TS has been calculated from the input signal IS by the grayscale conversion portion 100, the noise reduction degree determining portion 200 calculates the noise reduction degree NR from the input signal IS and the converted signal TS. With the image processing device 2000 according to the second embodiment of the invention, once a gain GN for grayscale conversion has been calculated from the input signal IS, the gain GN and the input signal IS are multiplied to calculate a converted signal TS, and the noise reduction degree NR is calculated from the input signal IS and the gain GN. This embodiment is described below using FIG. 9.

Figure 9:
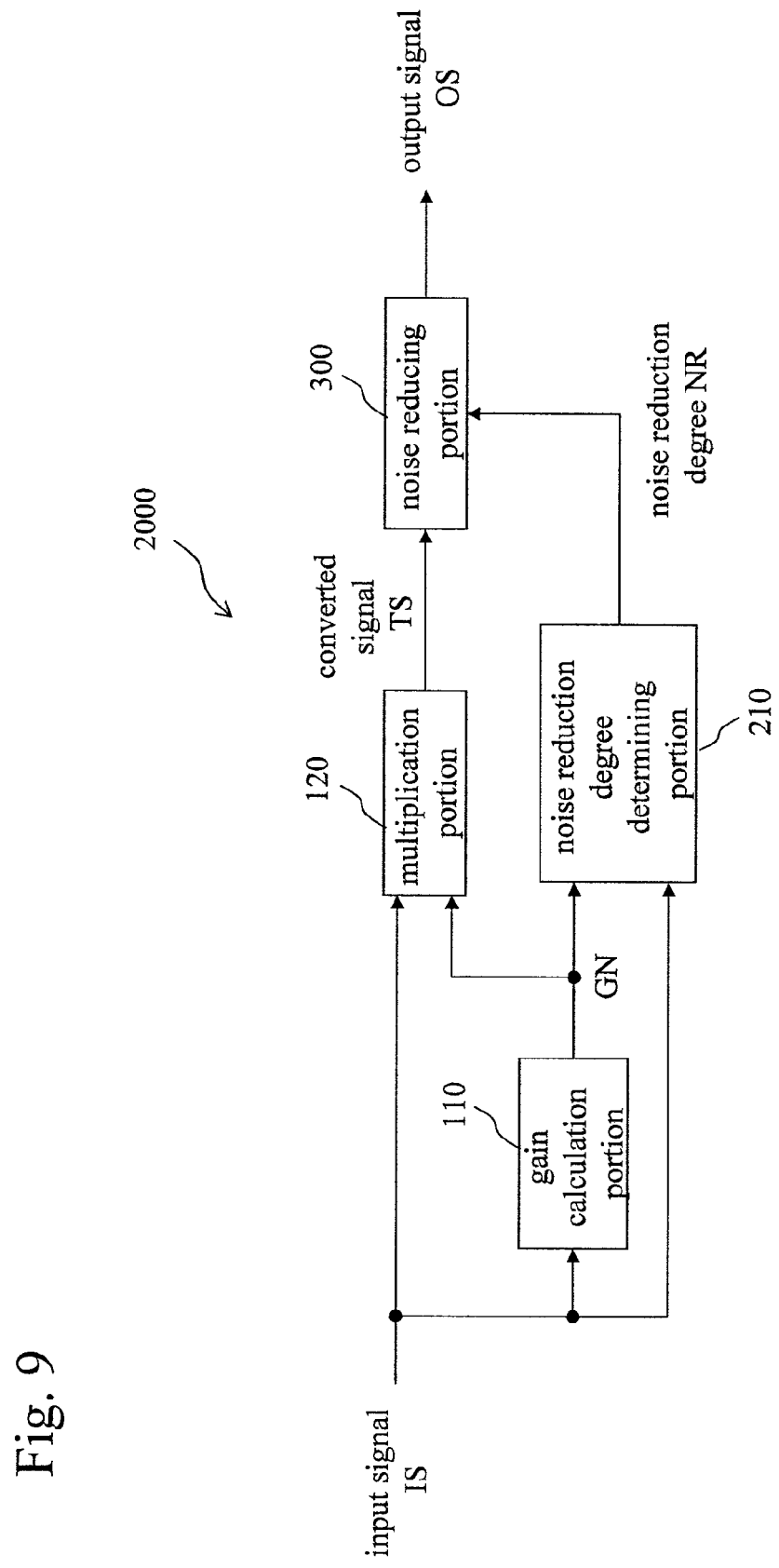
FIG. 9 is a block diagram of an image processing device according to the second embodiment of the invention.

FIG. 9 is a block diagram that shows the configuration of the image processing device 2000 according to the second embodiment of the invention. Hereinafter, portions that are identical to those of the first embodiment have been assigned the same reference numerals as before and will not be described in detail.

In FIG. 9, the image processing device 2000 according to the second embodiment of the invention is provided with a gain calculation portion 110 for outputting a gain GN from an input signal IS, a multiplication portion 120 for calculating a converted signal TS based on the input signal IS and the gain GN, a noise reduction degree determining portion 210 for calculating a noise reduction degree NR based on the input signal IS and the gain GN, and a noise reducing portion 300 for performing noise reduction processing on the converted signal TS based on the noise reduction degree NR to obtain an output signal OS.

When this configuration is used, the noise reduction degree determining portion 210 can specify pixels whose noise component has been amplified significantly when converted from the input signal IS to the converted signal TS, and the noise reducing portion 300 can execute suitable noise reduction processing based on the noise reduction degree NR that has been calculated by the noise reduction degree determining portion 210.

Thus, with the image processing device 2000 of this embodiment, it is possible to suitably execute noise reduction processing even on pixels whose noise component is amplified significantly when grayscale conversion is performed by multiplying the input signal and the gain, and thus by displaying the output signal OS that has been processed and output by the image processing device 2000 of this embodiment as an image (video picture) on a display device (not shown), it is possible to reproduce an image (video picture) that has preferable grayscale characteristics without amplifying noise components in the image.

Below, the functional portions in FIG. 9 that are different from those portions in the first embodiment are described.

The gain calculation portion 110 calculates the gain GN, which is the gain value for correcting the brightness or contrast of the input signal IS. The brightness or the contrast of the input signal IS is corrected by multiplying the gain GN and the input signal IS.

Figure 10:
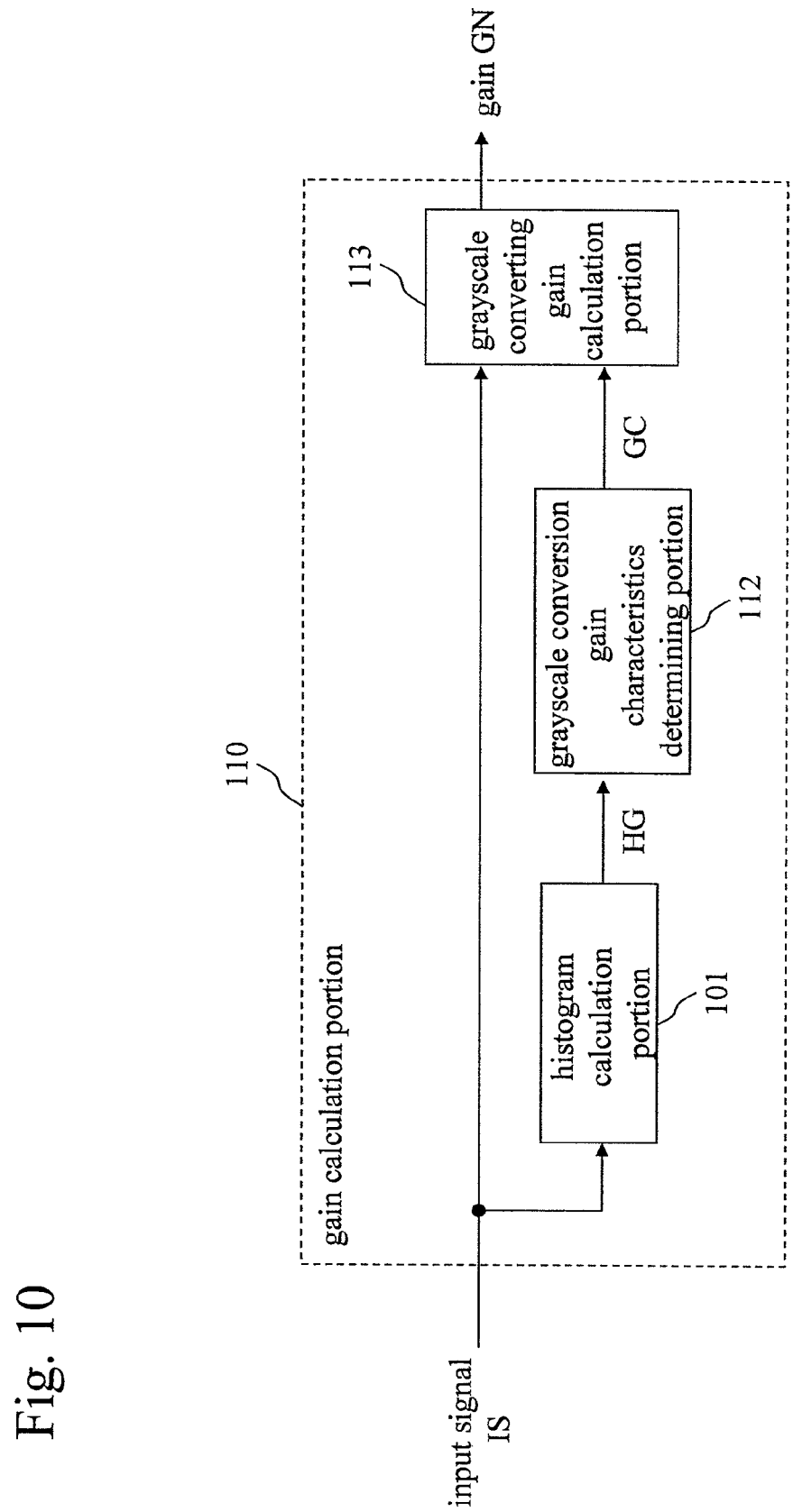
FIG. 10 is a block diagram of the gain calculation portion of the second embodiment.

To achieve the gain calculation portion 110, it is for example possible to adopt an approach that is based on histogram equalization, in which the grayscale of the input signal IS is transformed based on the histogram information. FIG. 10 is a block diagram that shows a configuration of the gain calculation portion 110 that is based on histogram equalization.

As shown in FIG. 10, the gain calculation portion 110 primarily includes a histogram calculation portion 101 for calculating histogram information HG from an input signal IS, a grayscale conversion gain characteristics determining portion 112 for determining the gain output characteristics GC from the histogram information HG, and a grayscale processing gain calculation portion 113 for calculating the gain GN based on the gain output characteristics GC and the input signal IS.

In FIG. 10, like in the histogram equalization described in the first embodiment, first the histogram calculation portion 101 calculates the histogram information HG from the input signal IS.

Next, the grayscale conversion gain characteristics determining portion 112 determines the gain output characteristics GC, which have been set so that a wide range of grayscale is allocated the more frequently a grayscale level (grayscale value) appears in the input signal IS based on the histogram information HG, for each target pixel of the input signal IS, for each predetermined block (region) made of a plurality of pixels that includes the target pixel, or for the entire image.

The grayscale processing gain calculation portion 113 outputs a gain GN for multiplication with the input signal IS of the target pixel, to the multiplication portion 120 and the noise reduction degree determining portion 210, based on the gain output characteristics GC that have been calculated by the grayscale conversion gain characteristics determining portion 112.

It should be noted that the method for calculating the gain is not limited to the method that is achieved by the gain calculation portion 110 shown in FIG. 10. Further, the configuration of the gain calculation portion 110 is not limited to the configuration that is shown in FIG. 10.

Modified Example

Gain-Type Spatial—Visual Processing

A modified example using a gain calculation method that is separate from the gain calculation method discussed above is described as a method for calculating the gain using grayscale conversion (gain calculation method).

The method of grayscale conversion (grayscale conversion using a gain) according to the modified example shown here is a method based on visual processing in which a gain is calculated based on the target pixel of the input signal IS and a signal obtained by performing predetermining processing on the pixels surrounding the target pixel.

Figure 11:
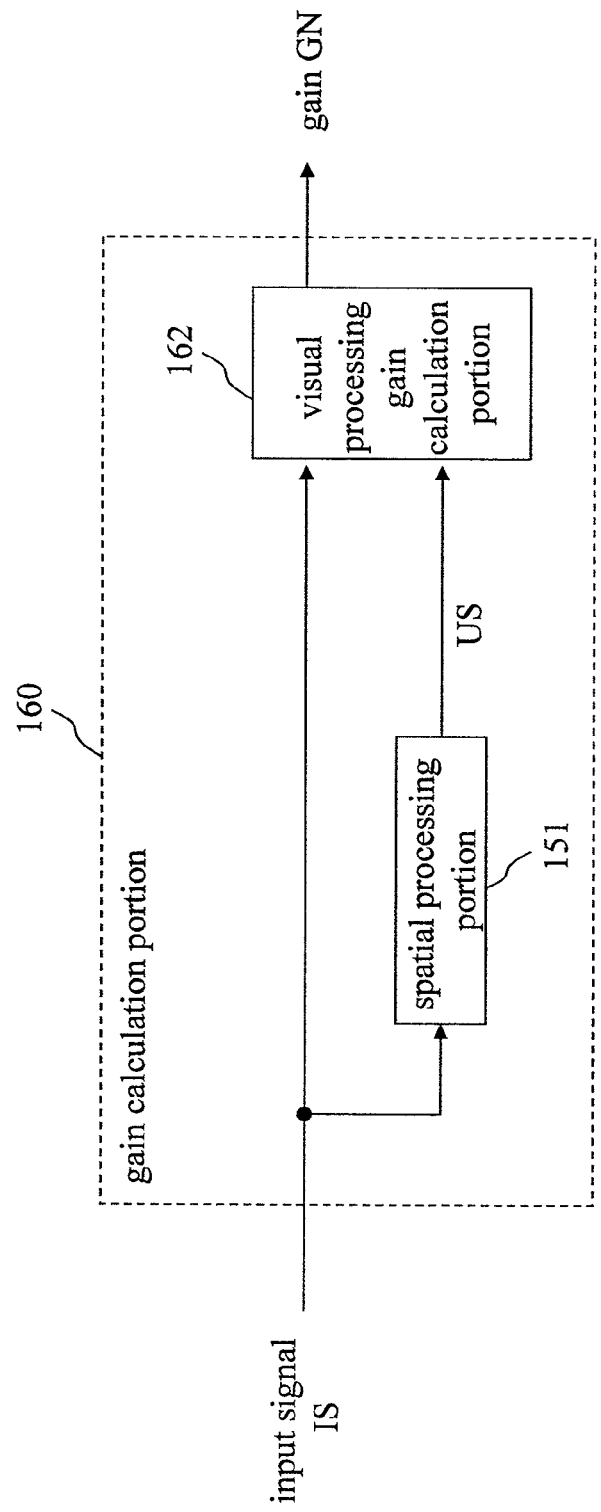
FIG. 11 is a block diagram of a modified example of the gain calculation portion of the second embodiment.

FIG. 11 is a block diagram that shows the configuration of a gain calculation portion 160 for performing grayscale conversion by visual processing according to this modified example. As shown in FIG. 11, the gain calculation portion 160 is provided with a spatial processing portion 151 that extracts a surrounding image signal US that includes the surrounding image information from the input signal IS, and a visual processing gain calculation portion 162 that calculates a gain GN for visual processing of the input signal IS according to the surrounding image signal US.

The processing by the spatial processing portion 151 is the same as in the first embodiment, which was described in FIG. 7, and thus here will not be described in detail.

Next, the visual processing gain calculation portion 162 calculates a gain GN to be multiplied with the input signal IS according to the input signal IS and the surrounding image signal US. Like in the modified example of the first embodiment, the processing in this case also is two-dimensional grayscale conversion, because the gain GN for converting the grayscale of the input signal IS is determined based on the two inputs of the surrounding image signal US and the input signal IS. Here, in order to achieve the same grayscale conversion characteristics as the two-dimensional grayscale conversion characteristics shown in FIG. 8, it is also possible to substitute the output value of the dimensional grayscale conversion characteristics with the ratio of the converted signal TS and the input signal IS (that is, the gain GN) shown in FIG. 8. These input/output characteristics are shown in FIG. 12.

Figure 12:
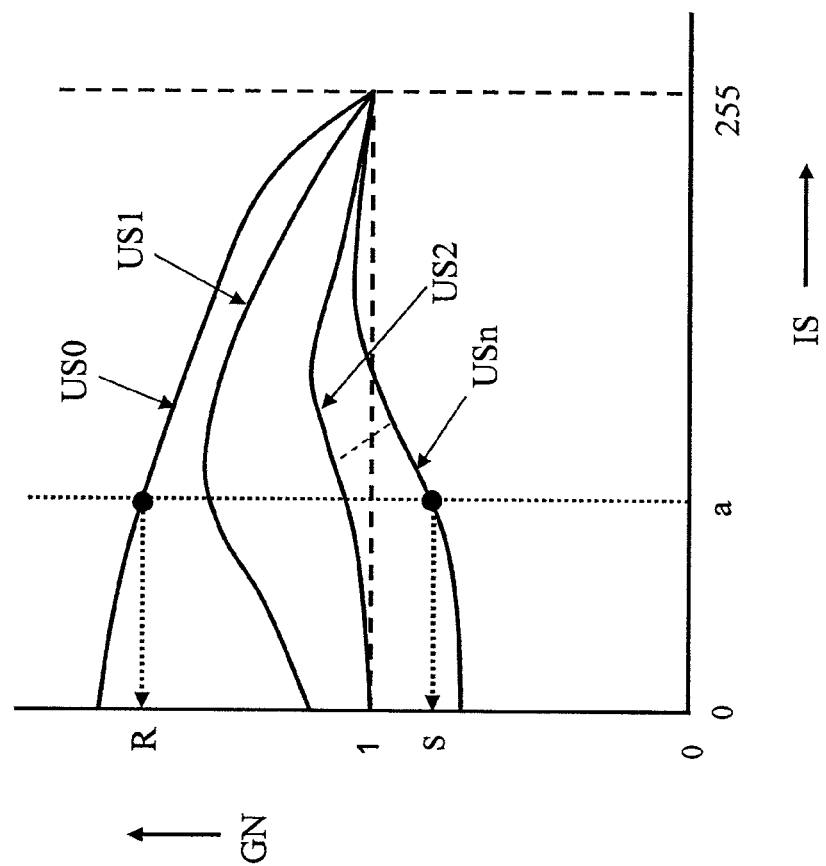
FIG. 12 is a diagram that shows the relationship between the input signal and the gain in the visual processing in the second embodiment.

As shown in FIG. 12, the processing of outputting the gain GN has predetermined gain GN output characteristics that depend on the signal level (grayscale value) of the surrounding image signal US and on US0 to USn (where n is an integer corresponding to the signal level (grayscale value)). In other words, two-dimensional gain conversion is achieved by selecting any one of the gain conversion curves US0 to USn according to the signal level (grayscale level) of the surrounding image signal US, and then converting the input signal IS (grayscale value of the IS) to a gain GN based on the gain conversion curve that has been selected. For example, the curve US1 of FIG. 12 is selected when the level (grayscale value) of the US signal is 1, and the curve US120 is selected when the level (grayscale value) of the US signal is 120. However, it is not absolutely necessary to prepare the same number of gain conversion curves US0 to USn as the number of grayscale values of the US signal, and it is also possible to for example prepare a smaller number of gain conversion curves US0 to USn than the number of grayscale values of the US signal, and for the gain conversion curves that are not readied, to achieve two-dimensional gain conversion by calculating a grayscale conversion curve that corresponds to the grayscale value of the US signal through interpolation of the gain conversion curves that have been prepared.

In two-dimensional gain conversion, for example, when the surrounding image signal US is an 8-bit value, the gain conversion characteristics are separated into 256 levels and these can be expressed as conversion curves each having predetermined gain GN output characteristics (gain conversion characteristics).

As shown in FIG. 12, the gain conversion characteristics that are corresponded with the grayscale conversion characteristics are expressed as a plurality of gain conversion curves (curves for converting the grayscale value to a gain value) that have gain conversion characteristics that correspond to predetermined gamma conversion characteristics, and the plurality of gain conversion curves have the relationship where the output monotonically decreases along with the subscript of the surrounding image signal US (if the grayscale value of the input signal is the same value, then the gain value that is output becomes a smaller value the larger the subscript (number) of the surrounding image signal US). It should be noted that the "relationship where the output monotonically decreases" is not strictly limited to a monotonically decreasing relationship, and even if there are places where the output partially does not monotonically decrease for the subscript of the surrounding image signal US, it is sufficient for it to be substantially monotonically decreasing.

The gain conversion characteristics that are corresponded with the two-dimensional grayscale conversion characteristics shown in FIG. 12 satisfy the relationship of (the output value when US=US0)≥(the output value when US=US1)≥ . . . ≥(the output value when US=USn) for the grayscale value of the pixels of all input signals IS. The contrast of local regions is enhanced by the gain conversion characteristics that correspond with these grayscale conversion characteristics.

In other words, the two-dimensional grayscale conversion characteristics that were described in the first embodiment are achieved by multiplying the input signal IS with the gain GN, which is determined by the gain conversion characteristics shown in FIG. 12. Consequently, the gain conversion characteristics that are shown in FIG. 12 can be used to achieve the processing of enhancing the contrast of the local area, like in the case described in the first embodiment.

According to the conversion characteristics shown in FIG. 12, when the input signal IS value (grayscale value) is "a," the value of the gain GN can take a value from "R" to "S" depending on the surrounding image signal US. That is, even with an input signal IS value (grayscale value) of "a," the gain GN (gain value) that is output may vary significantly between "R" and "S" depending on the surrounding image signal US.

Next, with the multiplication portion 120, the gain GN that has been obtained is multiplied with the input signal IS to obtain a converted signal TS.

Next, the noise reduction degree determining portion 210 inputs the input signal IS and the gain GN, and from the input signal IS and the gain GN calculates the noise reduction degree NR to be effected on the converted signal TS. The noise reduction degree determining portion 210 then outputs the noise reduction degree NR that it has calculated to the noise reducing portion 300. In general, the noise component is more significantly amplified for pixels the smaller the signal level (grayscale value) of the input signal IS and the larger the gain that is used for grayscale conversion. For this reason, it is preferable to execute stronger noise reduction processing the smaller the signal level (grayscale value) of the input signal IS and the larger the gain GN of the grayscale conversion.

Figure 13:
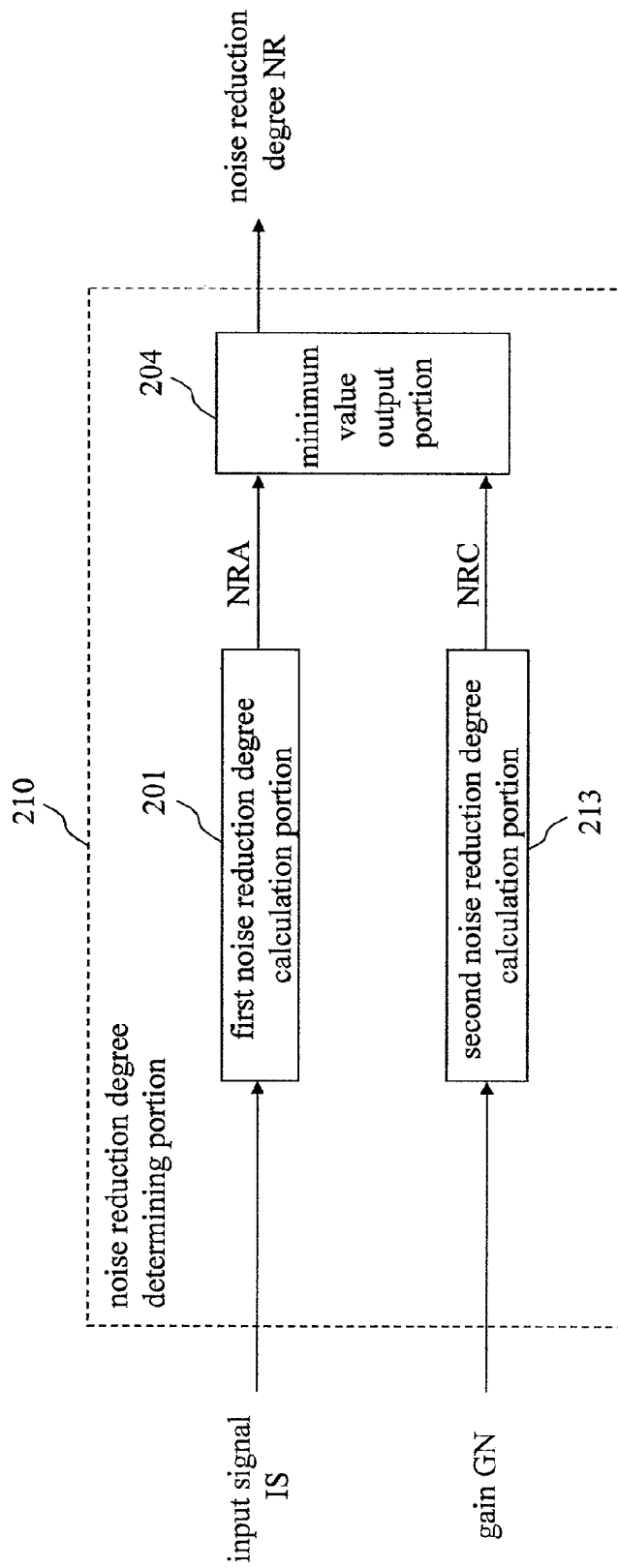
FIG. 13 is a block diagram of the noise reduction degree determining portion of the second embodiment.

FIG. 13 shows a block diagram of the noise reduction degree determining portion 210 for performing processing to calculate the noise reduction degree NR.

As shown in FIG. 13, the noise reduction degree determining portion 210 is primarily made of a first noise reduction degree calculation portion 201 that calculates a first noise reduction degree NRA from the input signal IS, a second noise reduction degree calculation portion 213 that calculates a second noise reduction degree NRC from the gain GN, and a minimum value output portion 204 serving as the noise reduction degree determining portion that outputs the smaller of the first noise reduction degree NRA and the second noise reduction degree NRC.

Figure 14:
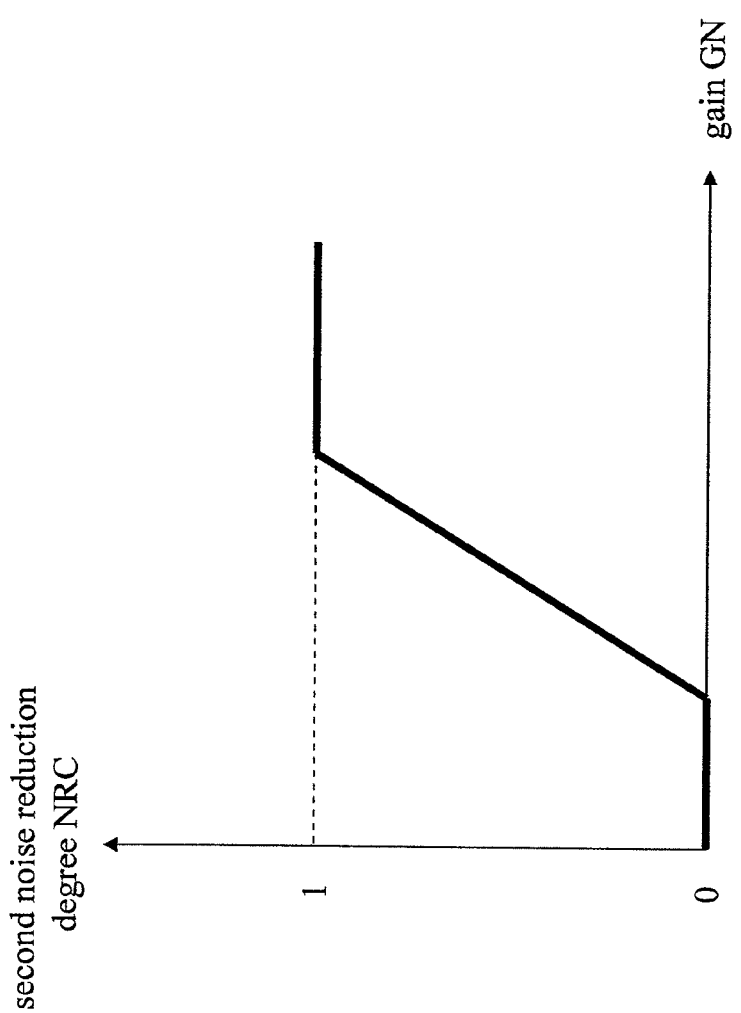
FIG. 14 is a diagram that shows the relationship between the gain and the second noise reduction degree in the second embodiment.

Like in the case described in the first embodiment, as shown in FIG. 4, it is preferable that the first noise reduction degree calculation portion 201 outputs a larger noise reduction degree NRA the smaller the input signal IS. On the other hand, it is preferable that the second noise reduction degree calculation portion 213 outputs a larger second noise reduction degree NRC the larger the gain GN. An example of these input/output properties is shown in FIG. 14.

Next, the minimum value output portion 204 outputs the smaller of the first noise reduction degree NRA that has been calculated by the first noise reduction degree calculation portion 201 and the second noise reduction degree NRC that has been calculated by the second noise reduction degree calculation portion 213, and thus a larger value is calculated as the noise reduction degree NR for pixels the smaller the signal level (grayscale value) of the input signal IS and the larger the gain GN with which processing has been performed. The noise reduction degree determining portion 210 outputs the noise reduction degree NR that has been calculated to the noise reducing portion 300. It should be noted that the processing by the minimum value output portion 204 is not limited to the processing described above, and for example it may also be processing in which the mean value (including the arithmetic mean and the geometrical mean) of the first noise reduction degree NRA and the second noise reduction degree NRC is found and that mean value is taken as the noise reduction degree NR, and processing in which the weighted mean of the first noise reduction degree NRA and the second noise reduction degree NRC is found and that weighted mean is taken as the noise reduction degree NR. Here, the weighted mean is obtained by first finding the smaller of the two values for the first noise reduction degree NRA and the second noise reduction degree NRC (this smaller value shall be called "value A" and the larger value shall be called "value B") and assigning a large weight to the value A and a small weight to the value B, and then averaging these to obtain the weighted mean. For example, it is possible to find the weighted mean through the equation (weighted mean)=((value A)×3+(value B))/4.

Next, the noise reducing portion 300 performs noise reduction processing on the converted signal TS based on the noise reduction degree NR. This processing is the same as that of the noise reducing portion 300 of the first embodiment, and thus will not be described in detail.

As described above, according to the image processing device 2000 of this embodiment, the degree with which the noise component of each pixel is amplified can be ascertained from the signal level (grayscale value) of the input signal IS and the value of the gain in a case where the input signal IS is grayscale converted by the gain into a converted signal TS (gain-type grayscale conversion), and thus by executing noise reduction at a strength that is appropriate for the degree to which the noise component is amplified, it is possible to obtain an output signal OS whose noise component has been suppressed and which has preferable grayscale characteristics. With the image processing device 2000 of this embodiment, it is possible to execute preferable gain-type grayscale conversion on an input signal IS without amplifying the noise component of the input signal IS, and output this as an output signal OS, and thus by displaying the output signal OS that is output from the image processing device 2000 according to this embodiment on a display device (not shown) as an image (video picture), it is possible to reproduce an image (video picture) that has preferable grayscale characteristics.

It should be noted that the noise reduction degree NR also can be calculated from the gain GN only. By doing this, it is possible to execute strong noise reduction processing on all pixels that have been processed with a high gain, regardless of the value of the input signal IS.

It is also possible to adjust the strength of the noise reduction processing by the noise reducing portion 300 by changing the filter coefficient of the low-pass filter that is applied to the converted signal TS. By doing this, it becomes possible to adjust the degree to which high-frequency components are reduced by a low-pass filter, and thus the degree to which noise is reduced can be adjusted.

Other Embodiments (Other Modified Examples)

It should be noted that the present invention has been described based on the above embodiments, but the invention is of course not limited to the embodiments discussed above. The invention is also inclusive of the following cases.

(1) The above devices specifically are computer systems made from a microprocessor, ROM, and RAM, for instance. The RAM stores a computer program. The microprocessor operates in accordance with the computer program, allowing each device to achieve its function. Here, in order to achieve a predetermined function, the computer program is arrived at by combining a plural number of command codes for indicating an order to the computer.

(2) Some or all of the structural elements making up the devices discussed above can be constituted by a single system LSI (Large Scale Integration). The system LSI is a multifunctional LSI that is produced by integrating a plurality of structural portions on a single chip, and specifically is a computer system that is constituted by a microprocessor, ROM, and RAM, for instance. The RAM stores a computer program. The microprocessor operates in accordance with the computer program, allowing the system LSI to achieve its function.

(3) Some or all of the structural elements making up the devices discussed above can be constituted by an IC card or a single module that can be attached to and detached from the devices. The IC card or the module is a computer system that is constituted by a microprocessor, ROM, and RAM, for instance. The IC card or the module may also include the multifunctional LSI discussed above. The microprocessor operates in accordance with a computer program, allowing the IC card or the module to achieve its function. It is also possible for the IC card or the module to be tamper-resistant.

(4) The invention also may be the methods indicated in the above discussion. It is possible for these methods to be a computer program that is achieved by a computer, or a digital signal that is made from the computer program. The invention also may be a computer-readable recording medium, such as a flexible disk, a hard disk, a CD-ROM, a MO, a DVD, a DVD-ROM, a DVD-RAM, a BD (Blu-ray Disc), or a semiconductor memory, on which the computer program or the digital signal is stored. The invention also may be the digital signal stored on these recording media.

The invention can be the computer program or the digital signal transferred via an electronic transmission line, a wireless or a wired communications line, a network such as the internet, or a data broadcast.

It is also possible for the invention to be a computer system provided with a microprocessor and a memory, in which the memory stores the computer program, and the microprocessor is operated according to the computer program.

By storing the program or the digital signal on a recording medium that is then transported, or by sending the program or the digital signal via a network, for example, it is possible to run the program or the digital signal on independent, separate computer systems.

(5) It is possible to combine the embodiments and the modified examples.

It is possible to conduct some or all of the processing of the embodiments with the pixel serving as the processing unit, and it is also possible to conduct some or all of the processing with blocks that are made from a plurality of pixels serving as the processing unit.

Each of the processing functions explained in the aforementioned embodiments may be carried out by hardware, or by software. Alternatively, it may be carried out by mixed processing using the hardware and software.

It should be noted that the specific configuration of the invention is not limited to the foregoing embodiments, and various changes and modifications are possible in a range that does not depart from the gist of the invention.

The image processing device, the image processing method, the image processing program, and the integrated circuit of the invention can reproduce an image that has preferable grayscale characteristics without amplifying noise components in the image, and thus they are useful in industrial fields related to image processing, and the image processing device, the image processing method, the image processing program, and the integrated circuit of the invention can be put to use in those fields.

What is claimed is:

1. An image processing device comprising:
   a grayscale conversion portion configured to obtain a converted signal by performing grayscale conversion on an input signal that is made from pixel data that form an image; and
   a noise reducing portion configured to execute noise reduction processing on the converted signal based on a signal level of the input signal and a grayscale conversion gain that is a ratio of the converted signal to the input signal,
   wherein (i) when the grayscale conversion portion performs the grayscale conversion on a first input signal value P1 and a second input signal value P2 that have a signal level I1 as the signal level of the input signal, (ii) when the noise reducing portion obtains two different gain values G1, G2 of the grayscale conversion gain for the first input signal value P1 and the second input signal value P2 respectively, and (iii) when the gain value G1 is greater than the gain value G2, the noise reducing portion reduces noise for the first input signal value P1 to a greater degree than for the second input signal value P2, and
   the noise reducing portion reduces noise for a third input signal value P3 that has a signal level I3 to a lesser degree than for the first input signal value P1, the signal level I3 being greater than the signal level I1.

2. The image processing device according to claim 1, wherein the signal level I1 is smaller than a specified signal level threshold.

3. An image processing method including:
   performing grayscale conversion on an input signal that is made from pixel data that form an image to obtain a converted signal; and
   executing noise reduction processing on the converted signal based on a signal level of the input signal and a grayscale conversion gain that is a ratio of the converted signal to the input signal,
   wherein (i) when the grayscale conversion is performed on a first input signal value P1 and a second input signal value P2 that have a signal level I1 as the signal level of the input signal, (ii) when two different gain values G1, G2 of the grayscale conversion gain are obtained for the first input signal value P1 and the second input signal value P2 respectively, and (iii) when the gain value G1 is greater than the gain value G2, the noise reduction processing reduces noise for the first input signal value P1 to a greater degree than for the second input signal value P2, and
   the noise reduction processing reduces noise for a third input signal value P3 that has a signal level I3 to a lesser degree than for the first input signal value P1, the signal level I3 being greater than the signal level I1.

* * * * *